(12) United States Patent
Kurokawa et al.

(10) Patent No.: US 11,644,709 B2
(45) Date of Patent: *May 9, 2023

(54) DISPLAY DEVICE

(71) Applicant: Japan Display Inc., Tokyo (JP)

(72) Inventors: Tae Kurokawa, Tokyo (JP); Kentaro Okuyama, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/830,563

(22) Filed: Jun. 2, 2022

(65) Prior Publication Data

US 2022/0291542 A1 Sep. 15, 2022

Related U.S. Application Data

(60) Continuation of application No. 17/092,808, filed on Nov. 9, 2020, now Pat. No. 11,378,836, which is a
(Continued)

(30) Foreign Application Priority Data

Sep. 12, 2017 (JP) ................. 2017-175057

(51) Int. Cl.
*G02F 1/1335* (2006.01)
*G02F 1/1334* (2006.01)
(Continued)

(52) U.S. Cl.
CPC ...... *G02F 1/133512* (2013.01); *G02F 1/1334* (2013.01); *G02F 1/133553* (2013.01);
(Continued)

(58) Field of Classification Search
CPC ............... G02F 1/1368; G02F 1/1334; G02F 1/133512; G02F 1/133553
See application file for complete search history.

(56) References Cited

U.S. PATENT DOCUMENTS

| 5,414,547 A | 5/1995 | Matsuo et al. |
| 6,873,382 B2 | 3/2005 | Chang |
| (Continued) | | |

FOREIGN PATENT DOCUMENTS

| JP | 60-120321 A | 6/1985 |
| JP | 5-203988 A | 8/1993 |
| (Continued) | | |

OTHER PUBLICATIONS

Japanese Office Action dated Aug. 17, 2021 in Japanese Patent Application No. 2017-175057 (with English translation), 6 pages.

*Primary Examiner* — Dung T Nguyen
(74) *Attorney, Agent, or Firm* — Maier & Maier, PLLC

(57) ABSTRACT

According to one embodiment, a display device includes a first substrate including a light-shielding layer and a conductive line having a first side surface and a second side surface on a side opposite to the first side surface, a second substrate opposed to the first substrate, a polymer dispersed liquid crystal layer held between the first substrate and the second substrate, and including a polymer and liquid crystal molecules, and a light-emitting element opposed to an end portion of at least one of the first substrate and the second substrate, wherein the first side surface is closer to the
(Continued)

light-emitting element than the second side surface, and the light-shielding layer covers at least the first side surface of the conductive line.

5 Claims, 20 Drawing Sheets

Related U.S. Application Data division of application No. 16/129,331, filed on Sep. 12, 2018, now Pat. No. 10,877,306.

(51) Int. Cl.
*G02F 1/13357* (2006.01)
*G02F 1/1333* (2006.01)
*G02F 1/1337* (2006.01)
*G02F 1/1343* (2006.01)
*G02F 1/1345* (2006.01)

(52) U.S. Cl.
CPC ...... *G02F 1/133615* (2013.01); *G02F 1/1337* (2013.01); *G02F 1/13452* (2013.01); *G02F 1/133345* (2013.01); *G02F 1/133365* (2013.01); *G02F 1/134309* (2013.01); *G02F 2201/121* (2013.01); *G02F 2201/123* (2013.01)

(56) References Cited

U.S. PATENT DOCUMENTS

| 7,796,204 | B2 | 9/2010 | Chang |
| 8,610,845 | B2 | 12/2013 | Lee |
| 11,378,836 | B2* | 7/2022 | Kurokawa ........ G02F 1/133615 |
| 2010/0085510 | A1 | 4/2010 | Okuyama et al. |
| 2010/0208169 | A1 | 8/2010 | Mun |
| 2011/0109663 | A1 | 5/2011 | Uchida et al. |
| 2011/0149201 | A1 | 6/2011 | Powell |
| 2012/0002142 | A1 | 1/2012 | Asaoka |
| 2014/0293182 | A1 | 10/2014 | Kim |
| 2015/0212358 | A1 | 7/2015 | Kashima |
| 2016/0070047 | A1 | 3/2016 | Okuyama et al. |
| 2017/0255072 | A1 | 9/2017 | Kaneko et al. |
| 2017/0277000 | A1* | 9/2017 | Shi .................. G02F 1/133553 |
| 2018/0031758 | A1 | 2/2018 | Mizuno |

FOREIGN PATENT DOCUMENTS

| JP | 2005-148387 A | 6/2005 |
| JP | 2010-92682 | 4/2010 |
| JP | 5467389 | 4/2014 |
| JP | 2016-57338 | 4/2016 |

* cited by examiner

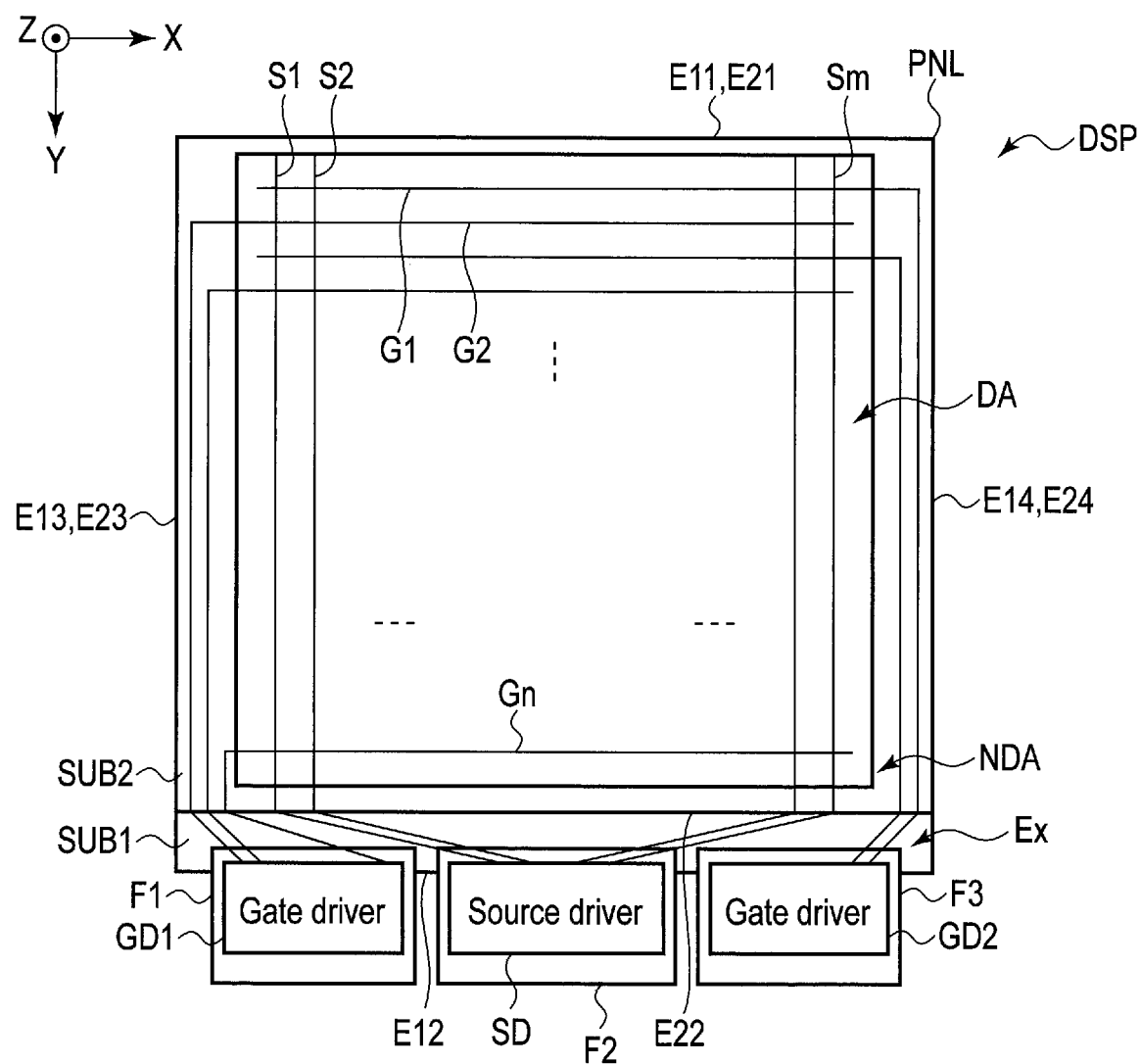
F I G. 1

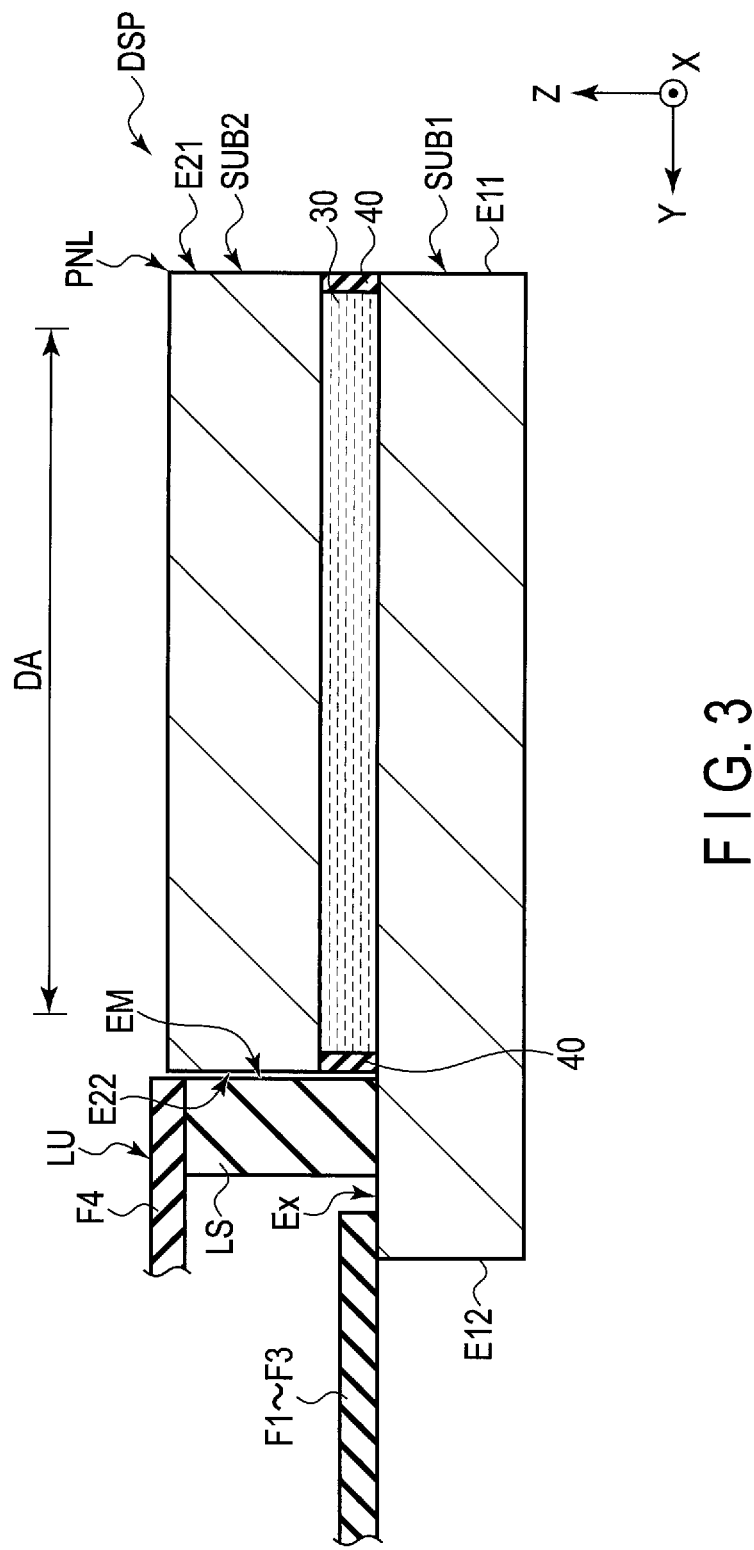
F I G. 3

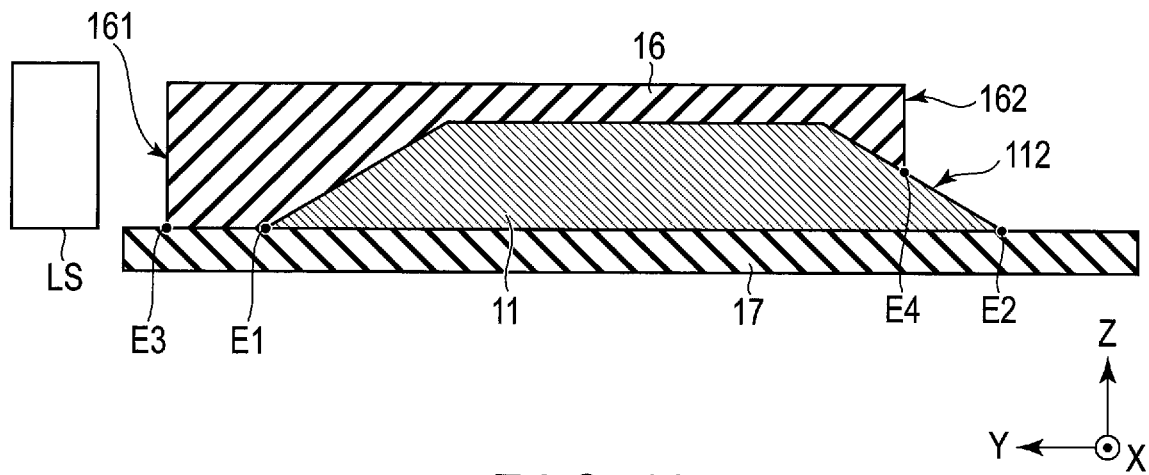
F I G. 12
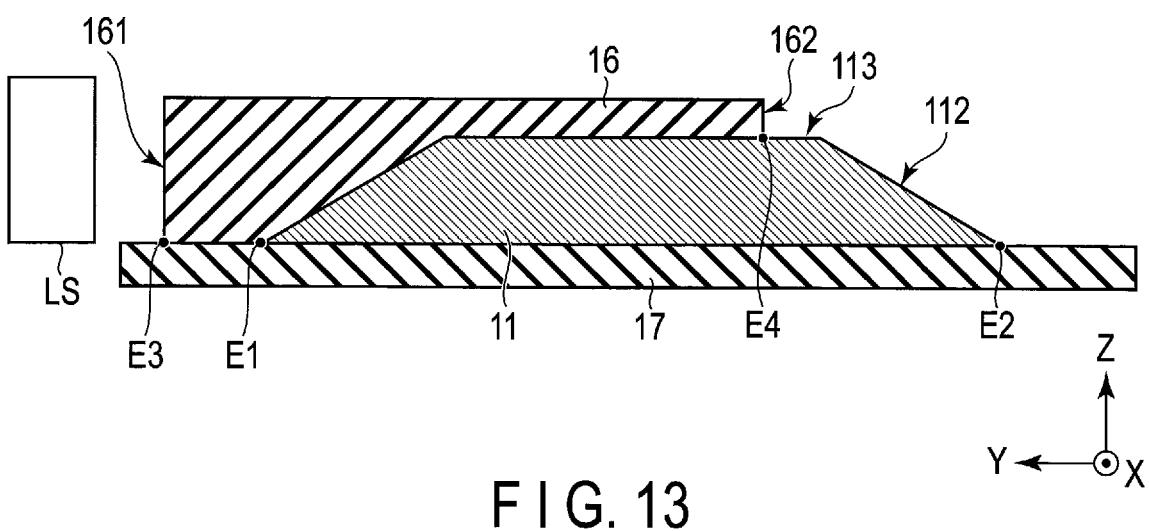
F I G. 13

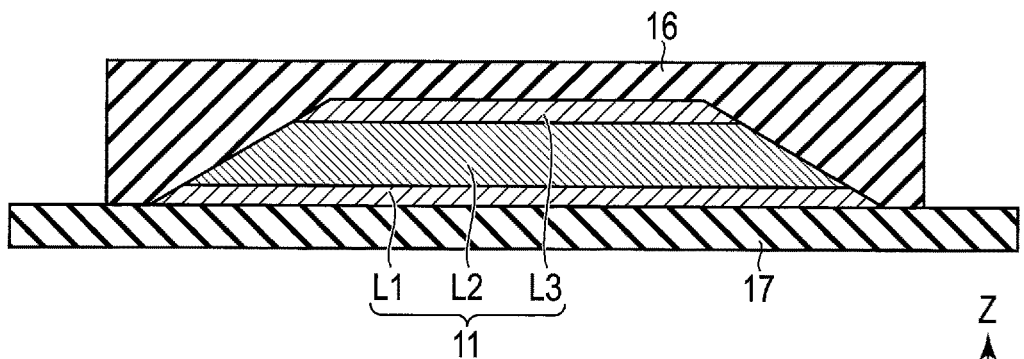
F I G. 14
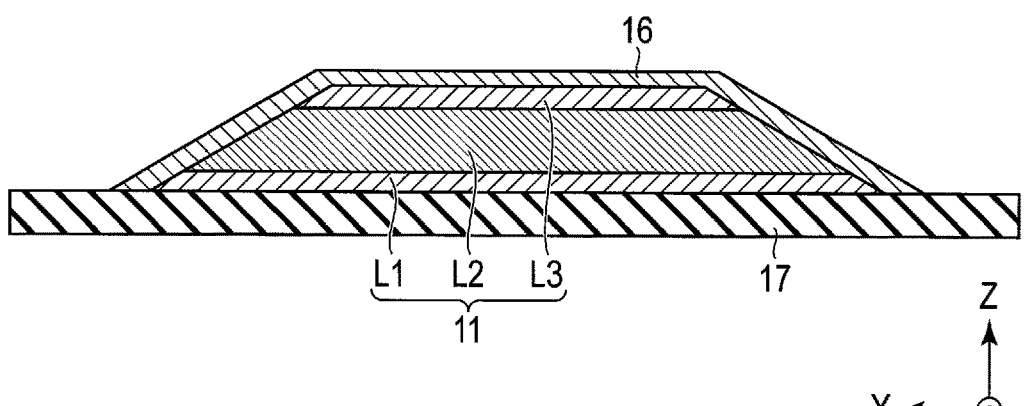
F I G. 15
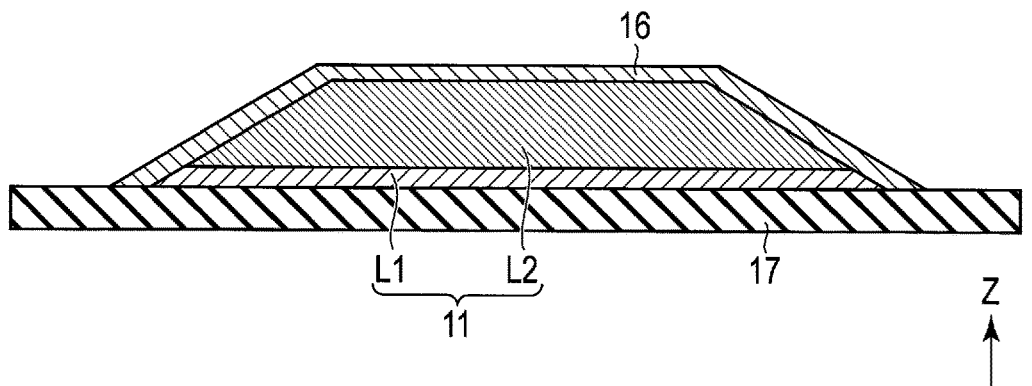
F I G. 16

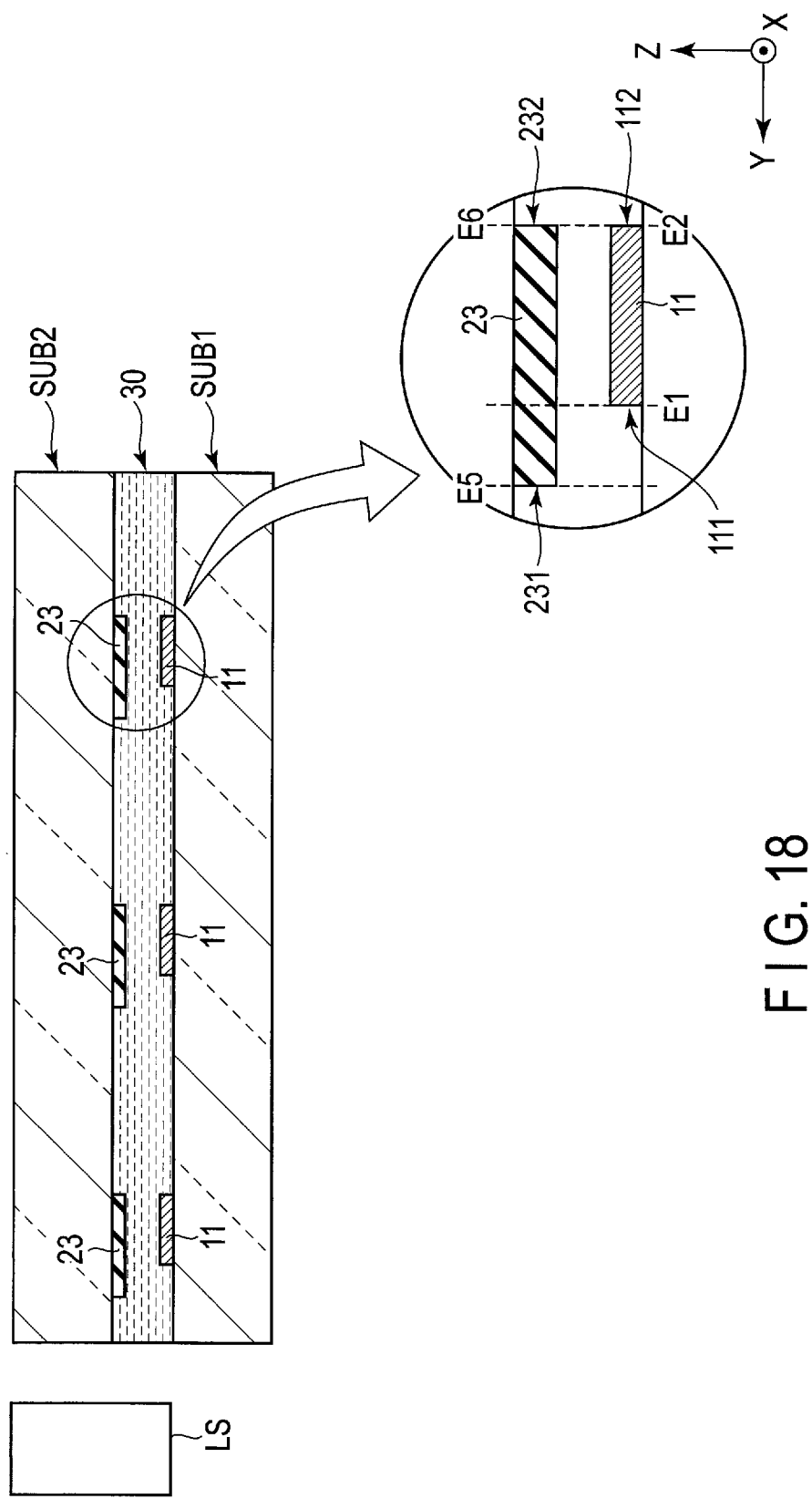
F I G. 18

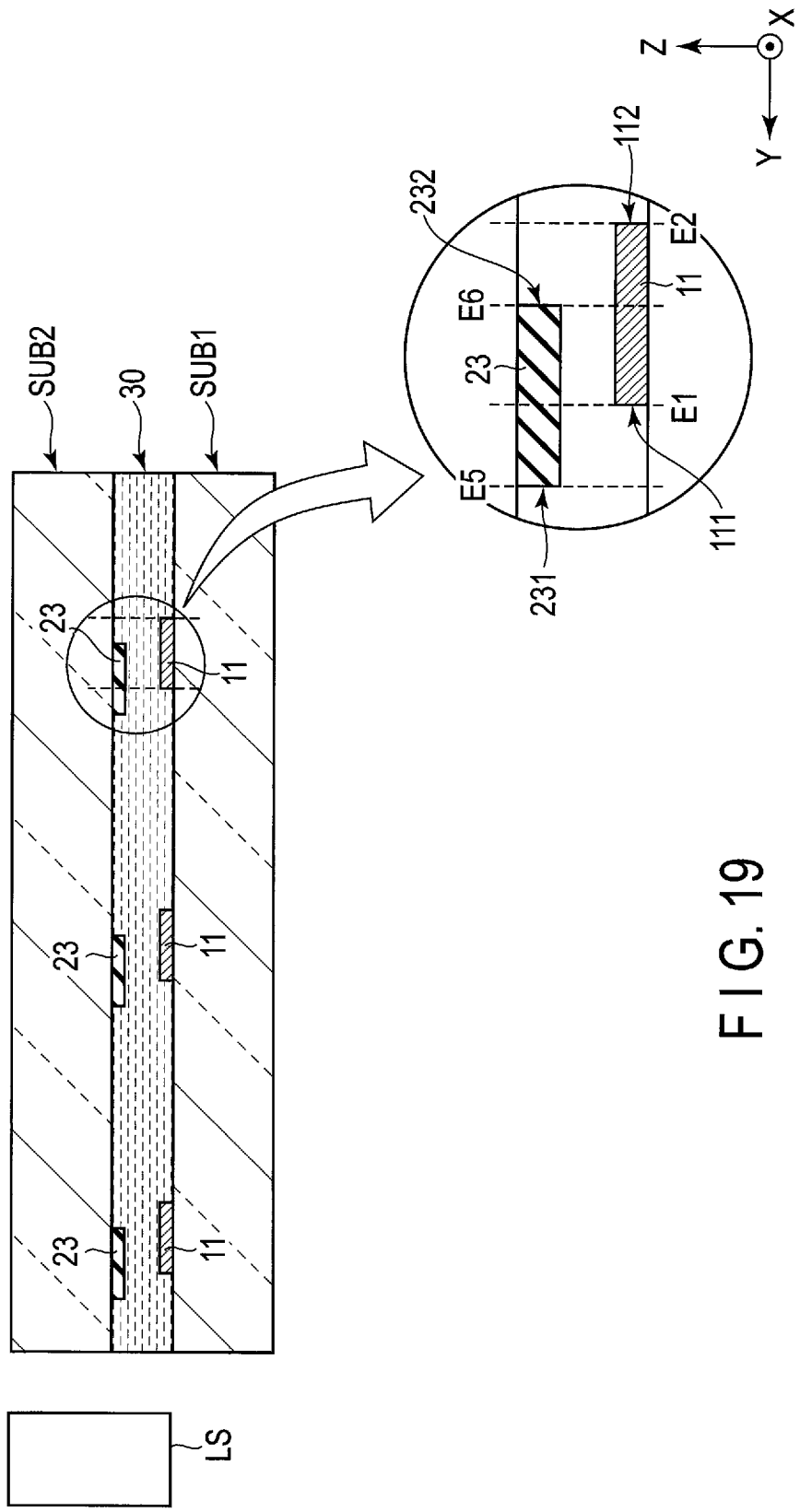
F I G. 19

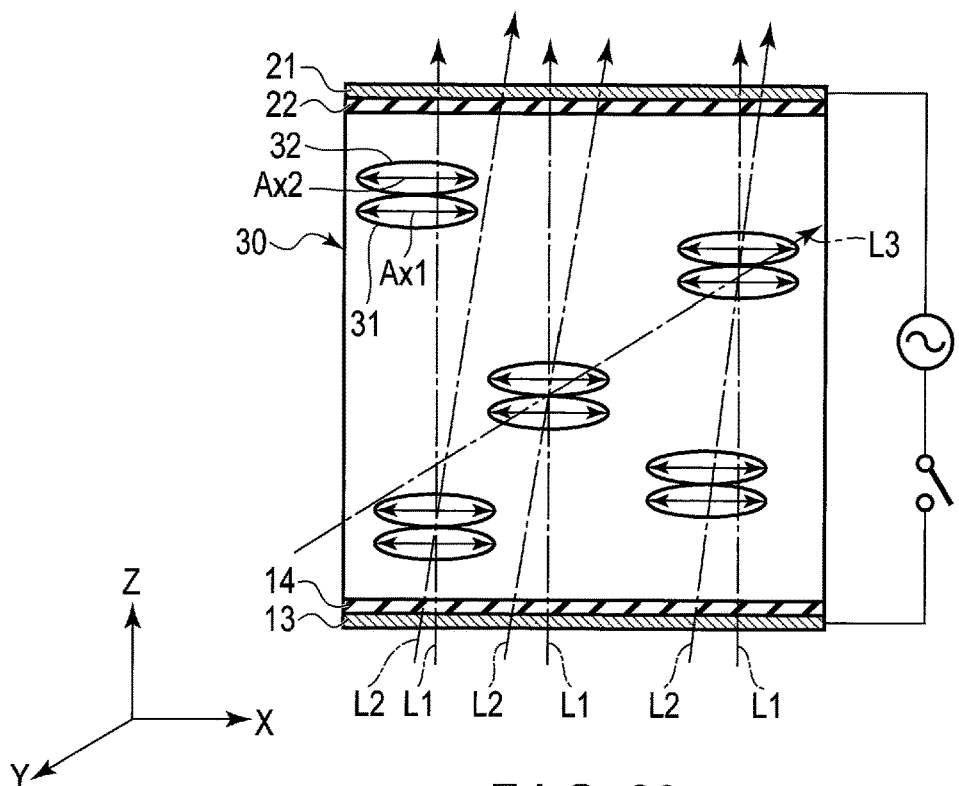
F I G. 23
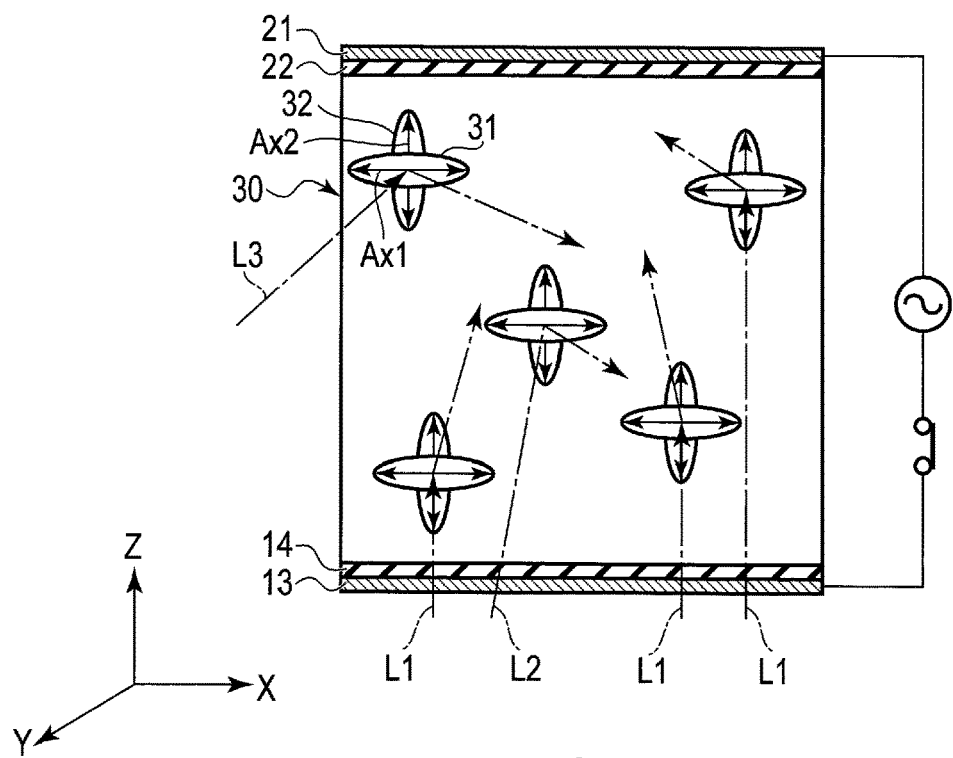
F I G. 24

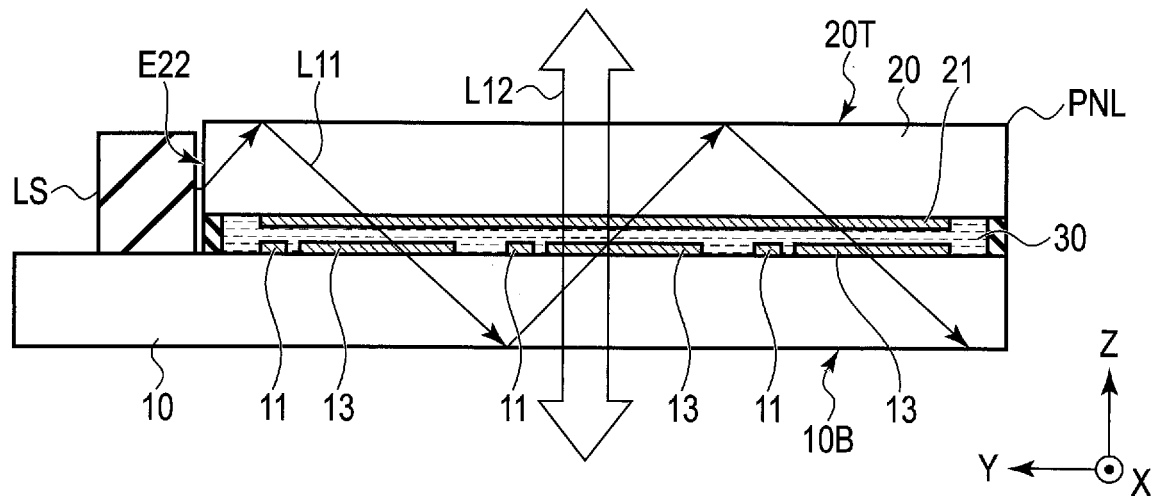
F I G. 25
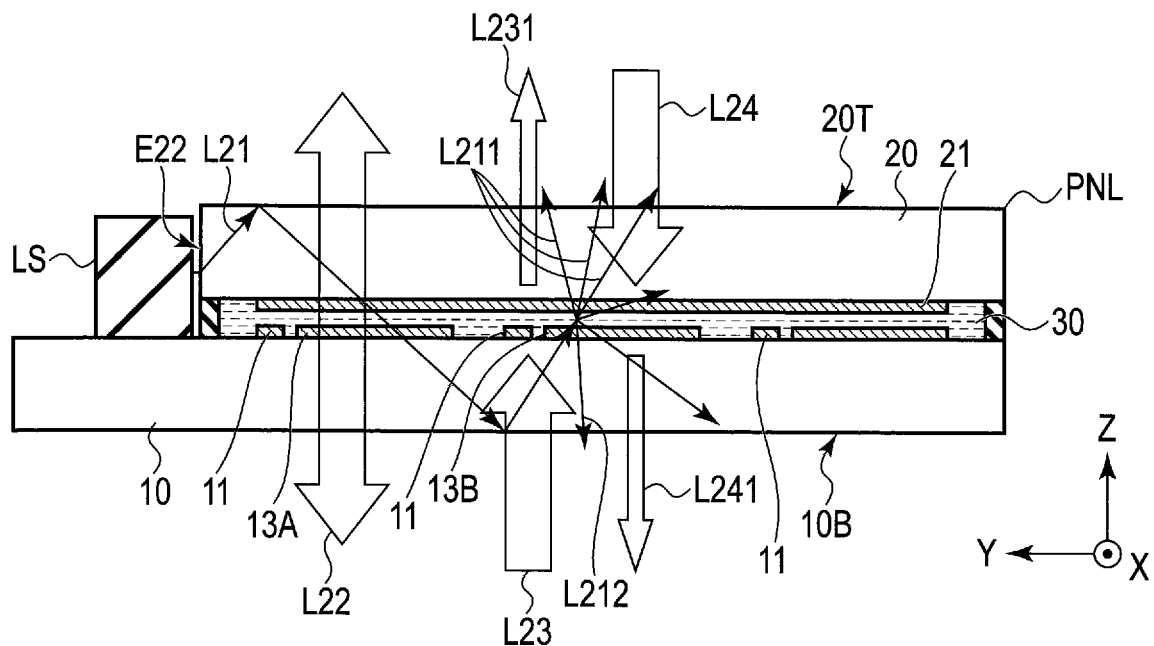
F I G. 26

DISPLAY DEVICE

CROSS-REFERENCE TO RELATED APPLICATIONS

This application is a Continuation of U.S. application Ser. No. 17/092,808 filed Nov. 9, 2020, which is a Divisional of U.S. application Ser. No. 16/129,331 filed Sep. 12, 2018, which is based upon and claims the benefit of priority from Japanese Patent Application No. 2017-175057, filed Sep. 12, 2017, the entire contents of each of which are incorporated herein by reference.

FIELD

Embodiments described herein relate generally to a display device.

BACKGROUND

Recently, various types of illumination devices using polymer dispersed liquid crystal (hereinafter called "PDLC") capable of switching a diffusing state of diffusing incident light and a transmitting state of transmitting incident light have been proposed.

In contrast, a display device using PDLC has been required to suppress degradation in display quality.

BRIEF DESCRIPTION OF THE DRAWINGS

FIG. 1 is a plan view showing a configuration example of a display device DSP according to the embodiments.

FIG. 3 is a cross-sectional view showing the display device DSP shown in FIG. 1.

FIG. 12 is a cross-sectional view showing a fifth configuration example of the Second Embodiment.

FIG. 13 is a cross-sectional view showing a sixth configuration example of Third Embodiment.

FIG. 14 is a cross-sectional view showing a seventh configuration example of a conductive line 11 and a light-shielding layer 16.

FIG. 15 is a cross-sectional view showing an eighth configuration example of the conductive line and the light-shielding layer 16.

FIG. 16 is a cross-sectional view showing a ninth configuration example of the conductive line 11 and the light-shielding layer 16.

FIG. 18 is a cross-sectional view showing Fifth Embodiment.

FIG. 19 is a cross-sectional view showing Sixth Embodiment.

FIG. 23 is an illustration schematically showing a liquid crystal layer 30 in a transparent state.

FIG. 24 is an illustration schematically showing the liquid crystal layer 30 in a scattering state.

FIG. 25 is a cross-sectional view showing a display panel PNL in a case where the liquid crystal layer 30 is in a transparent state.

FIG. 26 is a cross-sectional view showing the display panel PNL in a case where the liquid crystal layer 30 is in a scattering state.

DETAILED DESCRIPTION

Figure 2:
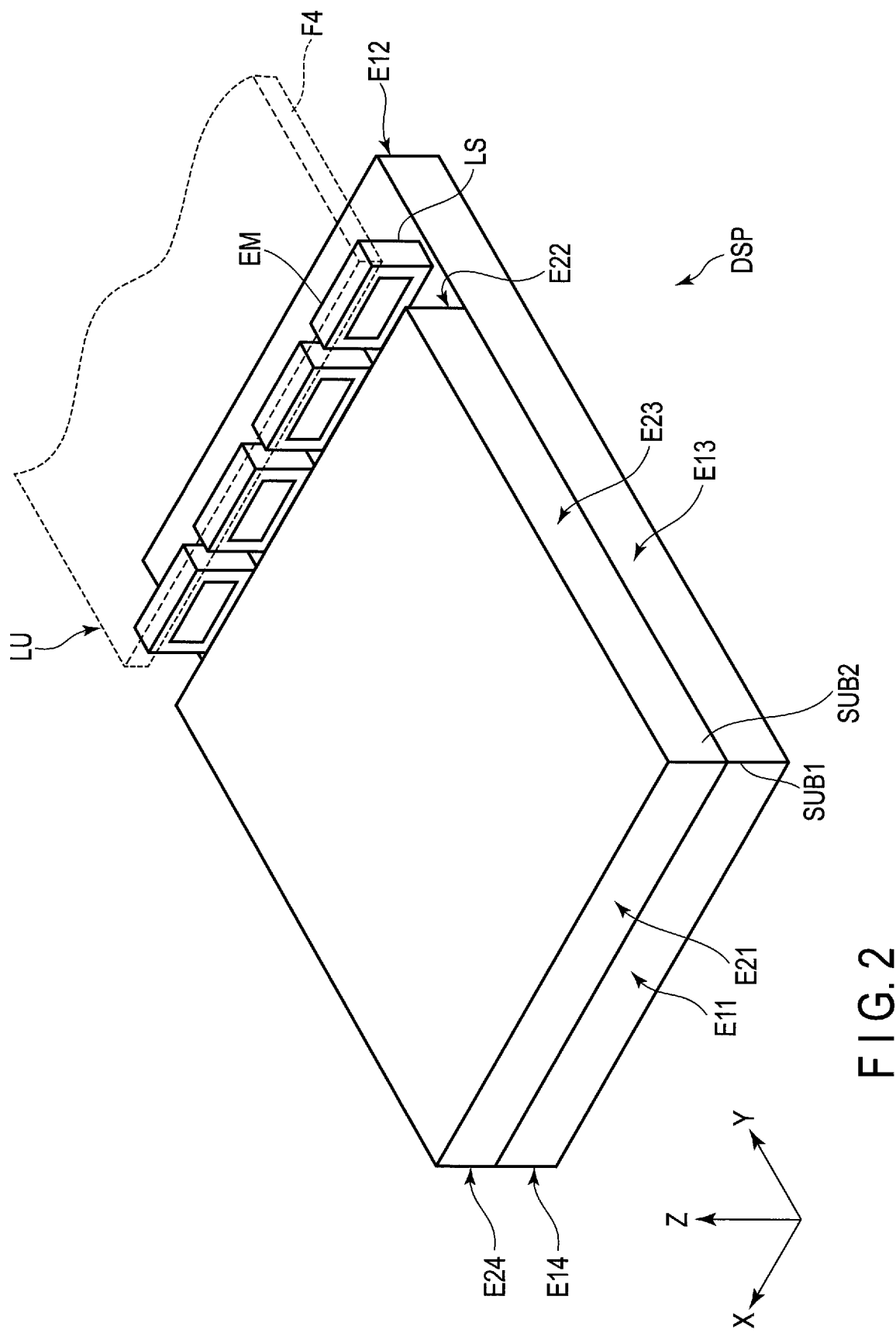
FIG. 2 is a perspective view showing the display device DSP shown in FIG. 1.

In general, according to one embodiment, a display device includes: a first substrate including a light-shielding layer and a conductive line having a first side surface and a second side surface on a side opposite to the first side surface; a second substrate opposed to the first substrate; a polymer dispersed liquid crystal layer held between the first substrate and the second substrate, and including a polymer and liquid crystal molecules; and a light-emitting element opposed to an end portion of at least one of the first substrate and the second substrate, wherein the first side surface is closer to the light-emitting element than the second side surface, and the light-shielding layer covers at least the first side surface of the conductive line.

According to another embodiment, a display device includes: a first substrate including a conductive line having a first side surface and a second side surface on a side opposite to the first side surface; a second substrate including a light-shielding layer and opposed to the first substrate; a polymer dispersed liquid crystal layer held between the first substrate and the second substrate, and including a polymer and liquid crystal molecules; and a light-emitting element opposed to an end portion of at least one of the first substrate and the second substrate, wherein the first side surface is closer to the light-emitting element than the second side surface, and the light-shielding layer is located just above at least the first side surface of the conductive line.

According to yet another embodiment, a display device includes: a first substrate including a scanning line and a first light-shielding layer; a second substrate opposed to the first substrate; and a polymer dispersed liquid crystal layer held between the first substrate and the second substrate, and including a polymer and liquid crystal molecules, wherein the first light-shielding layer covers the scanning line.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape and the like of each portion as compared with actual embodiments, but they are mere examples and do not restrict the interpretation of the invention. Furthermore, in the description and figures of the present application, structural elements having the same or similar functions will be referred to by the same reference numbers and detailed explanations of them that are considered redundant may be omitted.

FIG. 1 is a plan view showing a configuration example of a display device DSP according to the embodiments. In the drawing, a first direction X and a second direction Y intersect each other, and a third direction Z intersects the first direction X and the second direction Y. For example, the first direction X, the second direction Y, and the third direction Z are orthogonal to each other but may intersect at an angle other than ninety degrees. In the present specification, a position represented by a pointing end side of an arrow indicating the third direction Z will be referred to as "above", and a position represented by a rear end side of the arrow will be referred to as "below". When such expressions as "a second member above a first member" and "a second member below a first member" are used, the second member may be in contact with the first member or may be separated from the first member. In addition, an observation position at which the display device DSP is observed is assumed to be located on the pointing end side of the arrow indicating the third direction Z, and viewing from the observation position toward the X-Y plane defined by the first direction X and the second direction Y is called a planar view.

In the embodiments, a display device employing polymer dispersed liquid crystal will be explained as an example of the display device. The display device DSP comprises a display panel PNL and wiring substrates F1 to F3. In addition, the display device DSP also comprises a light source unit (not shown).

The display panel PNL comprises a first substrate SUB1 and a second substrate SUB2. The first substrate SUB1 and the second substrate SUB2 overlap in planar view. The display panel PNL includes a display area DA on which an image is displayed and a frame-shaped non-display area NDA surrounding the display area DA. The display area DA is located in an area where the first substrate SUB1 and the second substrate SUB2 overlap. The display panel PNL includes n scanning lines G (G1 to Gn) and m signal lines S (S1 to Sm), in the display area DA. Each of n and m is a positive integer, and n may be equal to or different from m. The scanning lines G extend in the first direction X and are arranged at intervals in the second direction Y. The signal lines S extend in the second direction Y and are arranged at intervals in the first direction X.

The first substrate SUB1 includes end portions E11 and E12 extending in the first direction X, and end portions E13 and E14 extending in the second direction Y. The second substrate SUB2 includes end portions E21 and E22 extending in the first direction X, and end portions E23 and E24 extending in the second direction Y. In the example illustrated, the end portions E11 and E21, the end portions E13 and E23, and the end portions E14 and E24 overlap each other in planar view, but may not overlap. The end portion E22 is located between the end portion E11 and the display area DA in planar view. The first substrate SUB1 includes an extension portion Ex between the end portions E12 and E22.

The wiring substrates F1 to F3 are connected to the extension portion Ex and arranged in this order in the first direction X. The wiring substrate F1 is provided with a gate driver GD1. The wiring substrate F2 is provided with a source driver SD. The wiring substrate F3 is provided with a gate driver GD2. The wiring substrates F1 to F3 may be replaced with a single wiring substrate.

The signal lines S are drawn to the non-display area NDA and connected to the source driver SD. The scanning lines G are drawn to the non-display area NDA and connected to the gate drivers GD1 and GD2. In the example illustrated, odd-numbered scanning lines G are drawn between the end portion E14 and the display area DA and connected to the gate driver GD2. In addition, even-numbered scanning lines G are drawn between the end portion E13 and the display area DA and connected to the gate driver GD1. The relationship in connection between the gate drivers GD1 and GD2 and the scanning lines G is not limited to the example illustrated.

FIG. 2 is a perspective view showing the display device DSP shown in FIG. 1. Illustration of the wiring substrates F1 to F3 is omitted. A light source unit LU is located above the first substrate SUB1 and disposed along the end portion E22. The light source unit LU comprises light-emitting elements LS corresponding to light sources and a wiring substrate F4 represented by a dotted line. The light-emitting elements LS are arranged at intervals in the first direction X. Each of the light-emitting elements LS is connected to the wiring substrate F4. The light-emitting elements LS are located between the first substrate SUB1 and the wiring substrate F4 in the third direction Z. The light-emitting elements LS are, for example, light-emitting diodes. Each of the light-emitting elements LS comprises a light-emitting portion EM. The light-emitting portion EM faces the end portion E22. The light-emitting portion EM may be in contact with the end portion E22. In addition, an air layer, an optical element, and the like may be interposed between the light-emitting portion EM and the end portion E22. The end portion E22 corresponds to an incidence portion in which the light emitted from the light-emitting portion EM is made incident.

FIG. 3 is a cross-sectional view showing the display device DSP shown in FIG. 1. Main portions alone in the cross-section of the display device DSP in a Y-Z plane defined by the second direction Y and the third direction Z will be explained here. The display panel PNL comprises a liquid crystal layer 30 held between the first substrate SUB1 and the second substrate SUB2. The first substrate SUB1 and the second substrate SUB2 are bonded to each other by a sealant 40.

In the example illustrated, the light-emitting element LS is located above an extension portion EX. In addition, the light-emitting element LS is located between the wiring substrate F1 to F3 and the second substrate SUB2 in the second direction Y. The light-emitting element LS emits light from the light-emitting portion EM to the end portion E22. The light incident from the end portion E22 is propagated through the display panel PNL in the second direction Y as explained below. The light-emitting element LS may be opposed to the end portions of the first substrate SUB1 and the second substrate SUB2, for example, the end portions E11 and E21.

Figure 4:
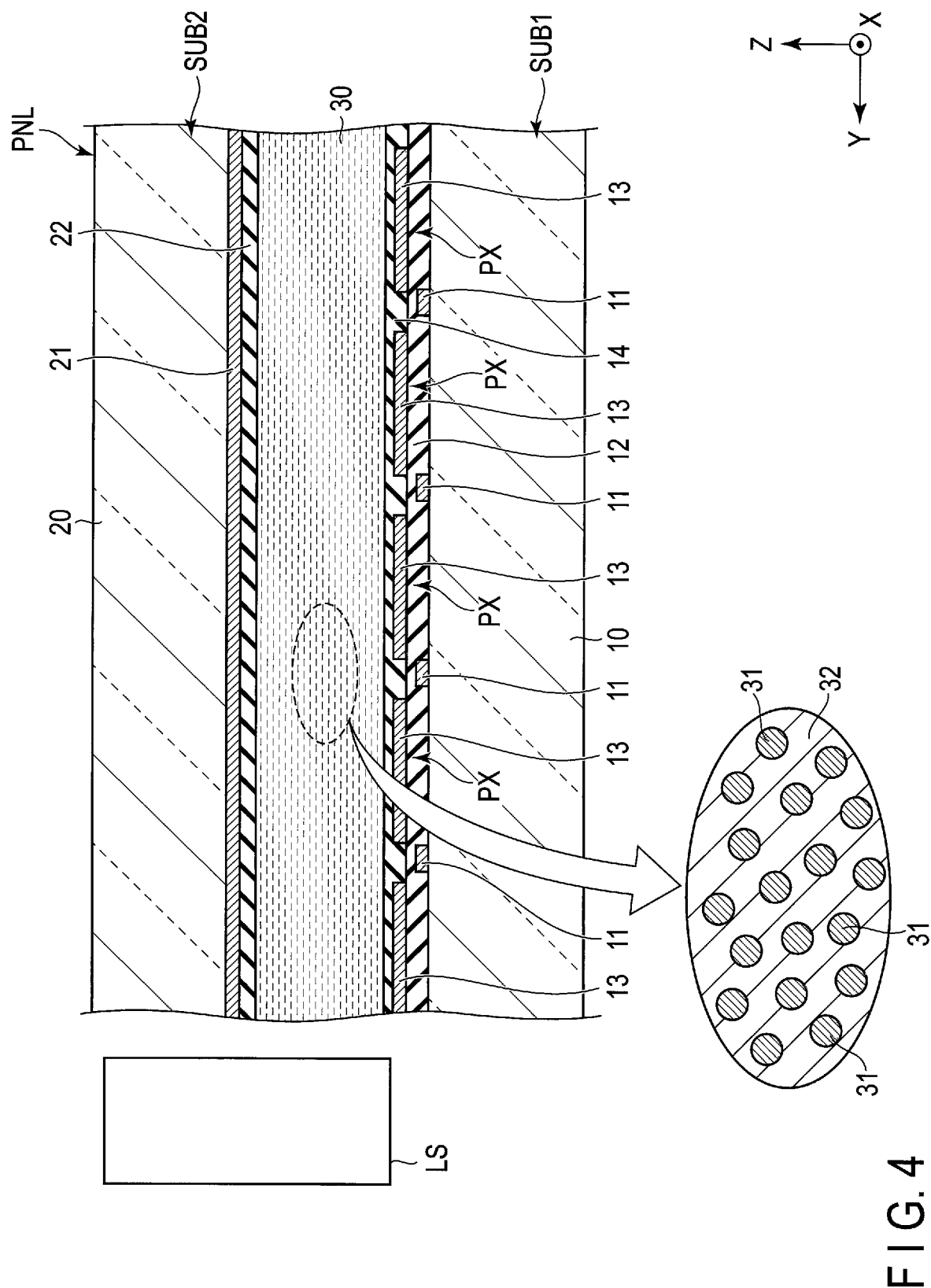
FIG. 4 is a cross-sectional view showing a configuration example of the display panel PNL shown in FIG. 3.

FIG. 4 is a cross-sectional view showing a configuration example of the display panel PNL shown in FIG. 3. The first substrate SUB1 comprises a transparent substrate 10, a conductive line 11, an insulating layer 12, a pixel electrode 13, and an alignment film 14. The second substrate SUB2 comprises a transparent substrate 20, a common electrode 21, and an alignment film 22. The second substrate SUB2 does not comprise a light-shielding layer overlapping the conductive line 11. The transparent substrates 10 and 20 are insulating substrates such as glass substrates or plastic substrates. The conductive line 11 is formed of an opaque metal material such as molybdenum, tungsten, aluminum, titanium or silver. The conductive line 11 illustrated extends in the first direction X but may extend in the second direction Y. The insulating layer 12 is formed of a transparent insulating material. The pixel electrodes 13 and the common electrode 21 are formed of a transparent conductive material such as indium tin oxide (ITO) or indium zinc oxide (IZO). The pixel electrodes 13 are disposed in the respective pixels PX. The common electrode 21 is disposed across the pixels PX. The alignment films 14 and 22 may be horizontal alignment films having an alignment restriction force approximately parallel to the X-Y plane or may be a vertical alignment films having an alignment restriction force approximately parallel to the third direction Z.

The liquid crystal layer 30 is located between the alignment films 14 and 22. The liquid crystal layer 30 is a polymer dispersed liquid crystal layer including polymer 31 which is a polymeric compound and liquid crystal molecules 32. For example, the polymer 31 is liquid crystal polymer. The polymer 31 can be obtained by, for example, polymerizing liquid crystal monomer in a state of being aligned in a predetermined direction by the alignment restriction force of the alignment films 14 and 22. For example, the alignment treatment direction of the alignment films 14 and 22 agrees with the first direction X, and the alignment films 14 and 22 have the alignment restriction force in the first direction X. For this reason, the polymer 31 is formed in a streaky shape or a stripe shape extending in the first direction X. The liquid crystal molecules 32 are dispersed in gaps of the polymer 31 and aligned such that their major axis extends in the first direction X.

The polymer 31 and the liquid crystal molecules 32 have optical anisotropy or refractive anisotropy. The liquid crystal molecules 32 may be positive liquid crystal molecules having a positive dielectric anisotropy or negative liquid crystal molecules having a negative dielectric anisotropy. The polymer 31 and the liquid crystal molecules 32 are different in response performance to the electric field. The response performance of the polymer 31 to the electric field is lower than the response performance of the liquid crystal molecules 32 to the electric field. At an enlarged portion in the figure, the polymer 31 is represented by upward-sloping hatch lines, and the liquid crystal molecules 32 are represented by downward-sloping hatch lines.

Figure 5:
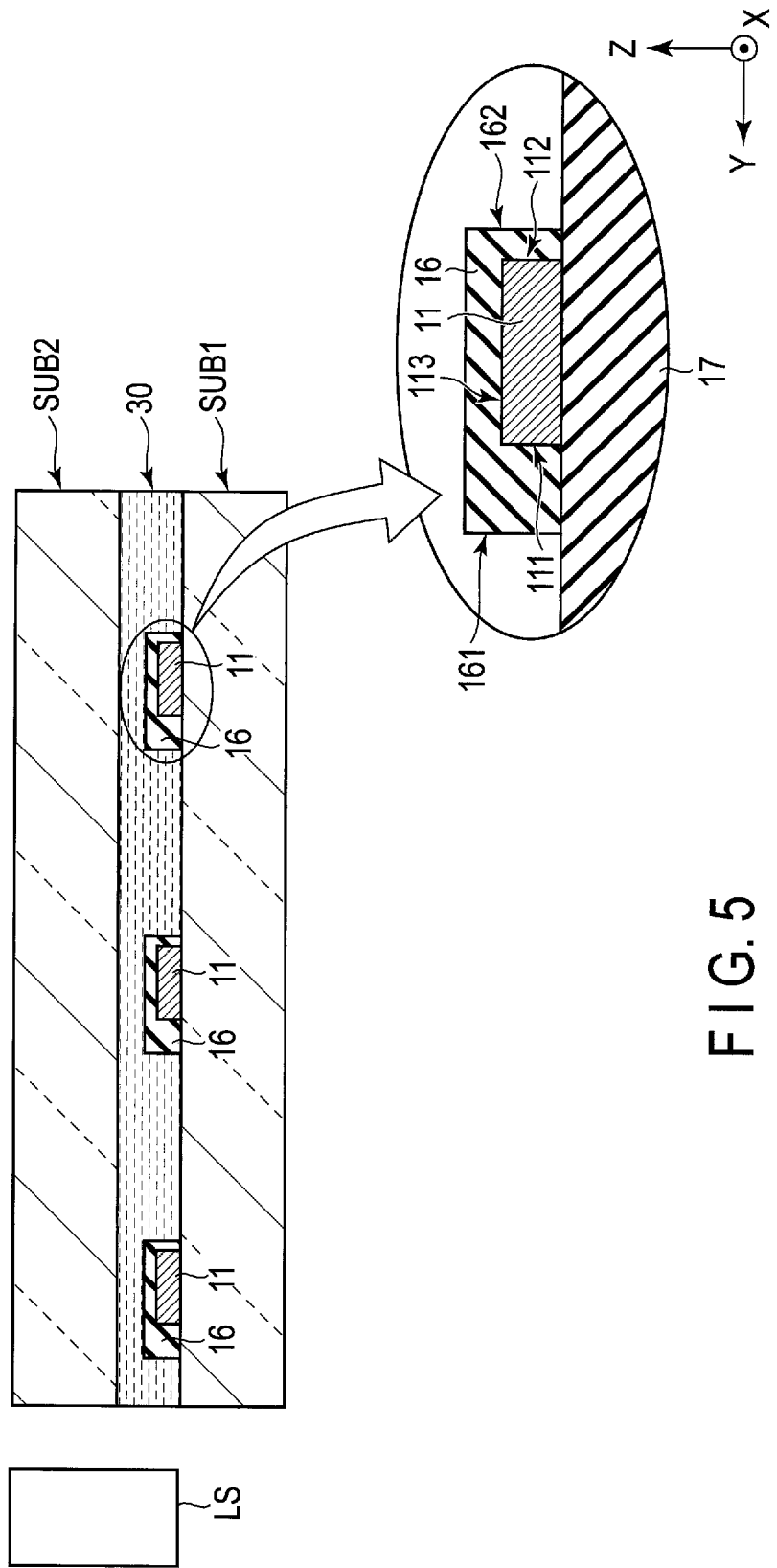
FIG. 5 is a cross-sectional view showing First Embodiment.

FIG. 5 is a cross-sectional view showing First Embodiment. The first substrate SUB1 comprises the light-shielding layer 16 as well as the conductive line 11. The light-shielding layer 16 covers the conductive line 11. In this example, "cover" implies not only a case where the light-shielding layer 16 is in contact with the conductive line 11, but also a case where the other member is interposed between the light-shielding layer 16 and the conductive line 11. In the First Embodiment, the light-shielding layer 16 is in contact with the conductive line 11, and covers the entire body of the conductive line 11. The embodiment will be explained in more detail with reference to an enlarged view of the conductive line 11 and the light-shielding layer 16, which is surrounded by a solid line.

The conductive line 11 comprise a first side surface 111, a second side surface 112 on a side opposite to the first side surface 111, and an upper surface 113. The first side surface 111 and the second side surface 112 extend in the first direction X. The first side surface 111 is closer to a light-emitting element LS than the second side surface 112. The light-shielding layer 16 comprises a third side surface 161, and a fourth side surface 162 on a side opposite to the third side surface 162. The third side surface 161 and the fourth side surface 162 extend in the first direction X. The third side surface 161 is closer to a light-emitting element LS than the fourth side surface 162. The light-shielding layer 16 covers the first side surface 111, the second side surface 112, and the upper surface 113. In other words, the third side surface 161 is closer to the light-emitting element LS than the first side surface 111, and the fourth side surface 162 is remoter from the light-emitting element LS than the second side surface 112. The light-shielding layer 16 is in contact with an insulating layer 17 located under the conductive line 11, on a side closer to the light-emitting element LS than the first side surface 111.

The light-shielding layer 16 is formed of a material having a low reflectance, low light-absorption index, or low light-shielding property. For example, the light-shielding layer 16 may be formed of a metal material such as molybdenum or an insulating material colored in black or the like.

Figure 6:
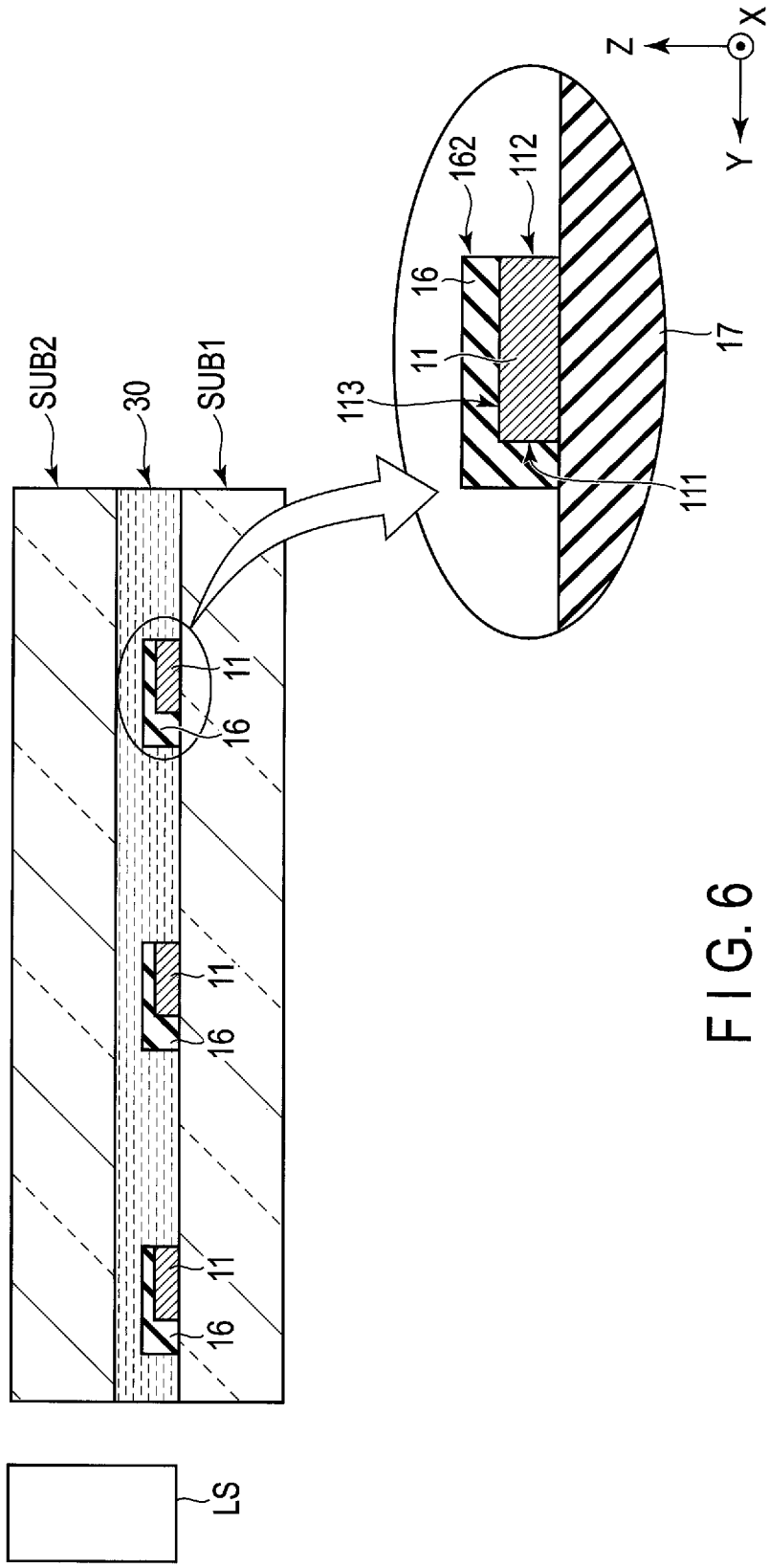
FIG. 6 is a cross-sectional view showing Second Embodiment.

FIG. 6 is a cross-sectional view showing Second Embodiment. The Second Embodiment is different from the First Embodiment with respect to a feature that a fourth side surface 162 is located just above a second side surface 112. In the example illustrated, the second side surface 112 and the fourth side surface 162 are located in the same plane parallel to X-Z plane defined by the first direction X and the third direction Z, but are not limited to this example. For example, at least one of the second side surface 112 and the fourth side surface 162 may be inclined or the second side surface 112 and the fourth side surface 162 may be inclined at different angles of inclination. In the Second Embodiment, at least a part of the fourth side surface 162 may be located on the second side surface 112. The first side surface 111 and the upper surface 113 are covered with a light-shielding layer 16 similarly to the First Embodiment.

Figure 7:
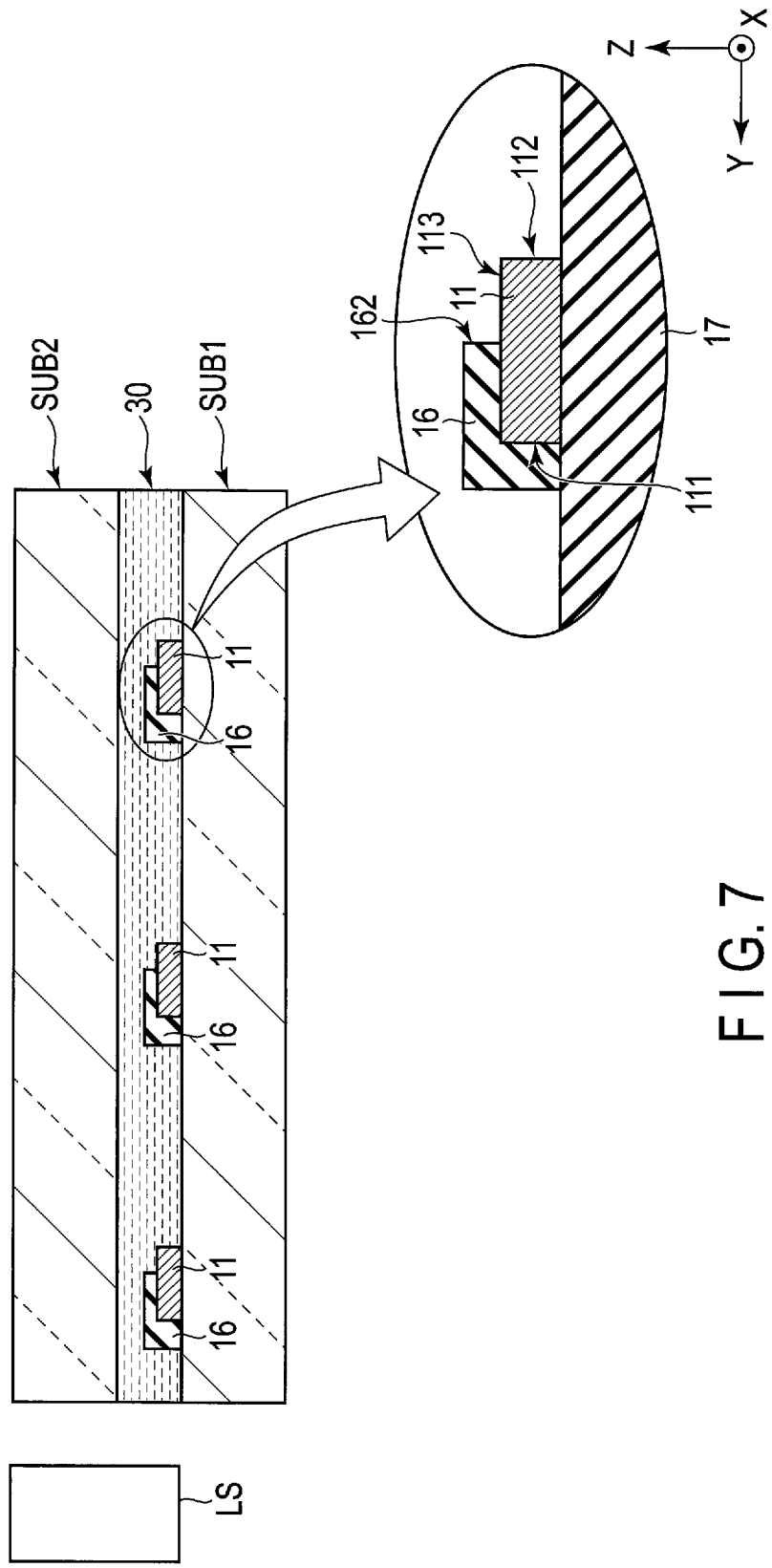
FIG. 7 is a cross-sectional view showing Third Embodiment.

FIG. 7 is a cross-sectional view showing Third Embodiment. The Third Embodiment is different from the First Embodiment with respect to a feature that a light-shielding layer 16 does not cover a second side surface 112. A fourth side surface 162 is located on an upper surface 113. The fourth side surface 162 is closer to a light-emitting element LS than the second side surface 112. A first side surface 111 and a part of the upper surface 113 are covered with the light-shielding layer 16 similarly to the First Embodiment.

As explained with reference to FIG. 2, light-emitting elements LS are arranged in the first direction X, and light emitted from the light-emitting elements LS is propagated in the second direction Y. In contrast, the first side surface 111 extends in the first direction X and intersects the direction of propagation of the light (or the first side surface 111 is substantially orthogonal to the direction of propagation of the light).

According to the First to Third Embodiments, the light-shielding layer 16 covers at least the first side surface 111, of the conductive line 11. For this reason, when the light from the light-emitting element LS is propagated through the display panel PNL, undesired reflection or scattering on the first side surface 111 facing the light-emitting element LS side of the conductive line 11 can be suppressed. Therefore, degradation in display quality of an image displayed on the display panel PNL can be suppressed.

In addition, according to the First Embodiment, since the light-shielding layer 16 covers the first side surface 111, the second side surface 112, and the upper surface 113 of the conductive line 11, undesired reflection or scattering on each of the surfaces of the conductive line 11 can be suppressed.

In addition, according to the Second Embodiment and the Third Embodiment, since the light-shielding layer 16 is not disposed on the side remoter from the light-emitting element LS than the second side surface 112, an area covered with the light-shielding layer 16, of the pixel can be reduced and an area contributing to the display per pixel can be increased.

Furthermore, according to the Third Embodiment, since a part of the upper surface 113 is exposed from the light-shielding layer 16, the part of the upper surface 113 can be used as a reflective surface for propagating the light from the light-emitting element LS through the display panel PNL, and the light propagation efficiency or light use efficiency can be improved.

Figure 8:
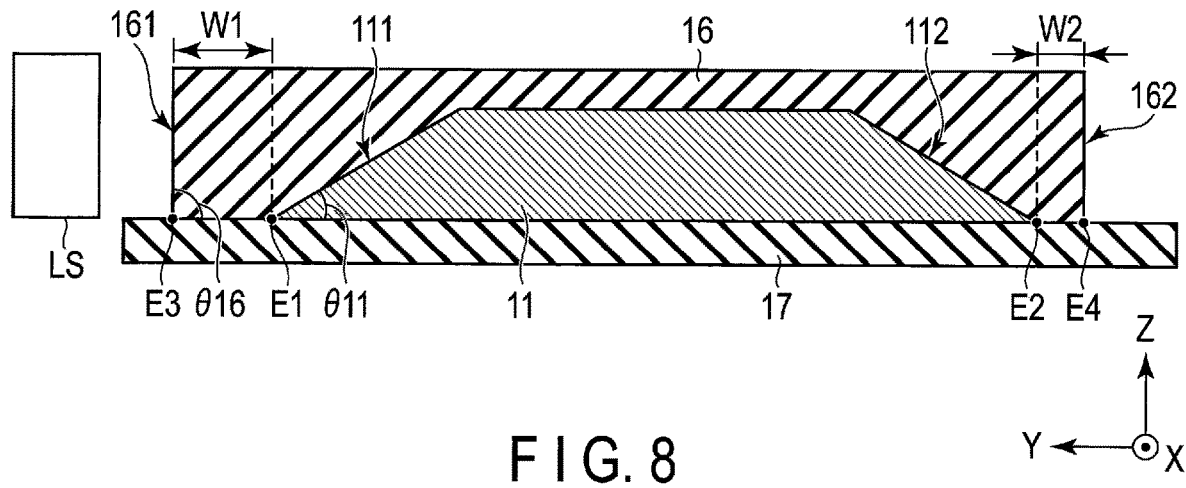
FIG. 8 is a cross-sectional view showing a first configuration example of First Embodiment.

FIG. 8 is a cross-sectional view showing a first configuration example of First Embodiment. The conductive line 11 comprises a first edge E1 and a second edge E2 located at outermost portions in the second direction Y. The second edge E2 is located on a side opposite to the first edge E1. The first edge E1 is closer to the light-emitting element LS than the second edge E2. The light-shielding layer 16 comprises a third edge E3 and a fourth edge E4 located at outermost portions in the second direction Y. The third edge E3 is closer to the light-emitting element LS than the first edge E1. The fourth edge E4 is remoter from the light-emitting element LS than the second edge E2. The light-shielding layer 16 has a first width W1 between the first edge E1 and the third edge E3, and a second width W2 between the second edge E2 and the fourth edge E4. Each of the first width W1 and the second width W2 is a length of the light-shielding layer 16 in the second direction Y. The first width W1 is larger than or equal to the second width W2.

The first side surface 111 is inclined to the insulating layer 17 at an acute angle, i.e., first angle of inclination $\theta11$. The second side surface 112 is inclined similarly to the first side surface 111. In the example illustrated, the first edge E1 corresponds to a portion which is the closest to the insulating layer 17, of the first side surface 111. Similarly, the second edge E2 corresponds to a portion which is the closest to the insulating layer 17, of the second side surface 112. The third side surface 161 is inclined to the insulating layer 17 at a second angle of inclination $\theta16$ larger than the first angle of inclination $\theta11$. For example, the second angle of inclination $\theta16$ is ninety degrees. The fourth side surface 162 is inclined similarly to the third side surface 161. In the example illustrated, the third edge E3 corresponds to a portion which is the closest to the insulating layer 17, of the third side surface 161. Similarly, the fourth edge E4 corresponds to a portion which is the closest to the insulating layer 17, of the fourth side surface 162.

Figure 9:
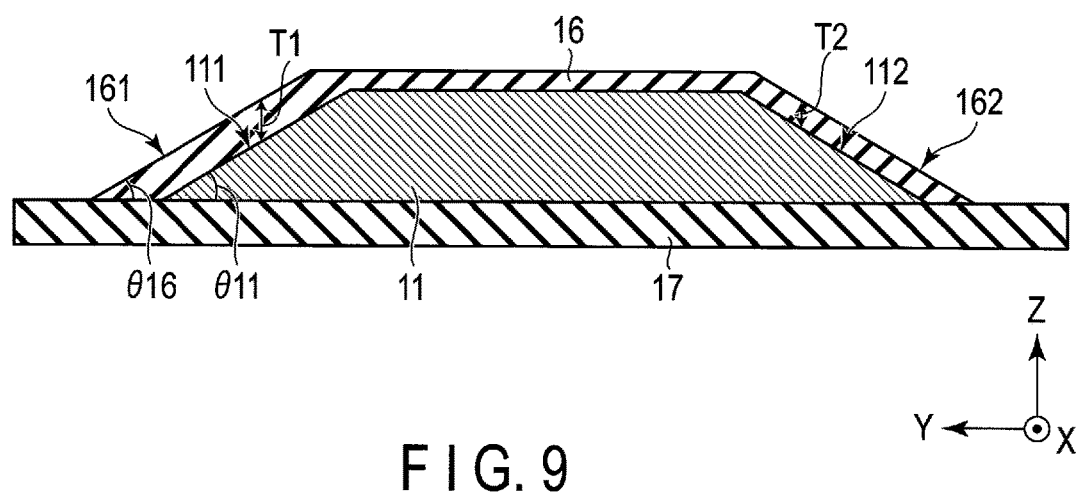
FIG. 9 is a cross-sectional view showing a second configuration example of the First Embodiment.

FIG. 9 is a cross-sectional view showing a second configuration example of the First Embodiment. The second configuration example is different from the first configuration example with respect to a feature that a second angle of inclination $\theta16$ is an acute angle. The third side surface 161 and the fourth side surface 162 are inclined to the insulating layer 17 at an acute angle, i.e., second angle of inclination $\theta16$. In the second configuration example, first thickness T1 of the light-shielding layer 16 overlapping the first side surface 111 is larger than or equal to second thickness T2 of the light-shielding layer 16 overlapping the second side surface 112. Each of the first thickness T1 and the second thickness T2 is a length of the light-shielding layer 16 in the third direction Z.

Figure 10:
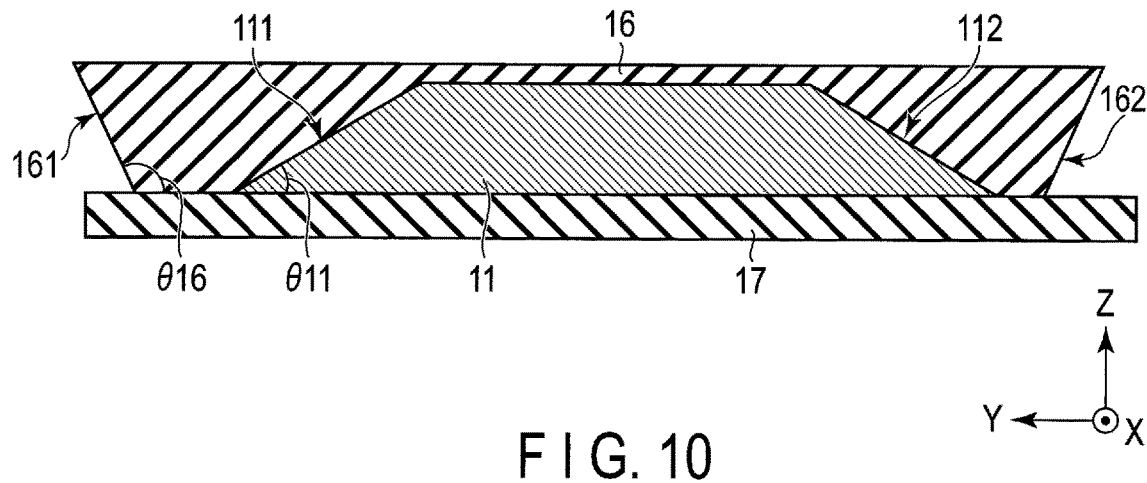
FIG. 10 is a cross-sectional view showing a third configuration example of the First Embodiment.

FIG. 10 is a cross-sectional view showing a third configuration example of the First Embodiment. The third configuration example is different from the first configuration example with respect to a feature that the second angle of inclination $\theta16$ is an obtuse angle. The third side surface 161 and the fourth side surface 162 are inclined to the insulating layer 17 at an obtuse angle, i.e., second angle of inclination $\theta16$. For this reason, even if the light propagating the display panel PNL is reflected on the third side surface 161, upward reflection or scattering in the third direction Z can be suppressed.

Figure 11:
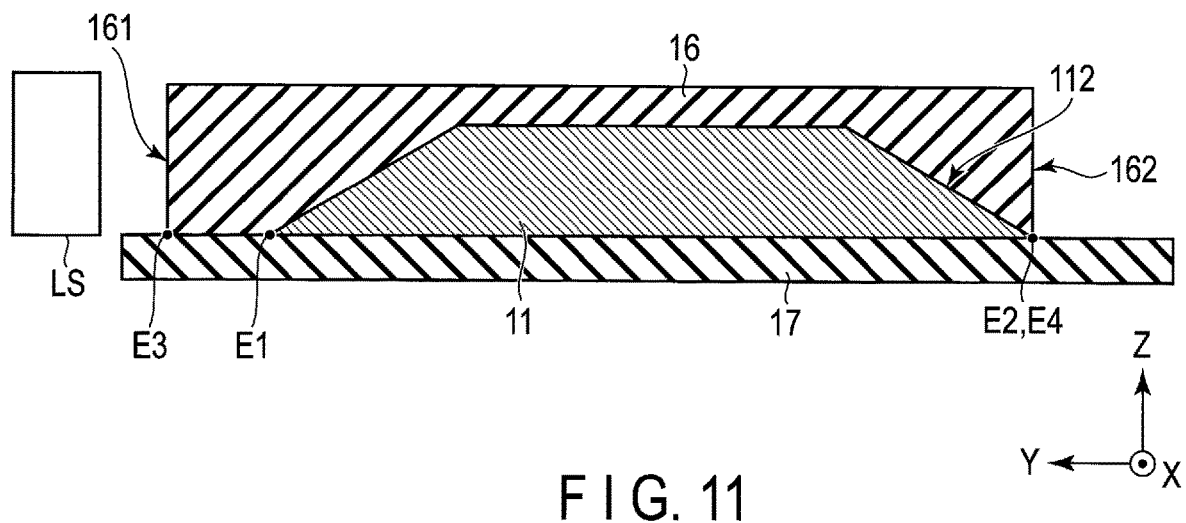
FIG. 11 is a cross-sectional view showing a fourth configuration example of Second Embodiment.

FIG. 11 is a cross-sectional view showing a fourth configuration example of Second Embodiment. In the Second Embodiment, a fourth edge E4 is located just above a second edge E2. A third edge E3 is closer to a light-emitting element LS than a first edge E1, similarly to the First Embodiment shown in FIG. 8 to FIG. 10.

FIG. 12 is a cross-sectional view showing a fifth configuration example of the Second Embodiment. The fifth configuration example is different from the fourth configuration example with respect to a feature that the fourth edge E4 is located on a second side surface 112. In other words, the fourth edge E4 is closer to the first edge E1 than the second edge E2. The third edge E3 is closer to a light-emitting element LS than the first edge E1, similarly to the First Embodiment shown in FIG. 8 to FIG. 10.

FIG. 13 is a cross-sectional view showing a sixth configuration example of Third Embodiment. In the Third Embodiment, a fourth edge E4 is located on an upper surface 113. A third edge E3 is closer to a light-emitting element LS than a first edge E1. The third side surface 161 and the fourth side surface 162 in the fourth to sixth configuration examples may be inclined similarly to the second and third configuration examples.

FIG. 14 is a cross-sectional view showing a seventh configuration example of a conductive line 11 and a light-shielding layer 16. The conductive line 11 is composed of a multilayer body comprising a first layer L1, a second layer L2, and a third layer L3. For example, the first layer L1 and the third layer L3 are formed of the same material, and the second layer L2 is formed of a material different from the material of the first layer L1. For example, the first layer L1 and the third layer L3 are formed of molybdenum or titanium, and the second layer L2 is formed of aluminum. The conductive line 11 can be obtained by forming a stacked layer body of three metal layers, i.e., a molybdenum layer, an aluminum layer, and a molybdenum layer on the insulating layer 17 and entirely patterning the stacked layer body. The light-shielding layer 16 is formed of a material having a low reflectance, low light-absorption index, or low light-shielding property and covers the conductive line 11. For example, the light-shielding layer 16 is formed of an organic material.

FIG. 15 is a cross-sectional view showing an eighth configuration example of the conductive line and the light-shielding layer 16. An eighth configuration example shown in FIG. 15 is different from the seventh configuration example shown in FIG. 14 with respect to a cross-sectional shape of the light-shielding layer 16. The conductive line 11 is composed of the same multilayer body as the seventh configuration example. The light-shielding layer 16 is formed of a material having a low reflectance, low light-absorption index, or low light-shielding property and covers the conductive line 11. For example, the light-shielding layer 16 is formed of an inorganic material.

FIG. 16 is a cross-sectional view showing a ninth configuration example of the conductive line 11 and the light-shielding layer 16. The conductive line 11 is composed of a multilayer body comprising a first layer L1 and a second layer L2. The light-shielding layer 16 is formed of, for example, a metal material such as molybdenum and covers the conductive line 11. The conductive line 11 can be obtained by forming, for example, a stacked layer body of a molybdenum layer and an aluminum layer on the insulating layer 17 and entirely patterning the stacked layer body. In addition, the light-shielding layer 16 can be obtained by forming, for example, a molybdenum layer on the insulating layer 17 and the conductive line 11 and patterning the molybdenum layer. For example, the first layer L1 and the light-shielding layer 16 are formed of the same material and are, for example, molybdenum layers.

Figure 17:
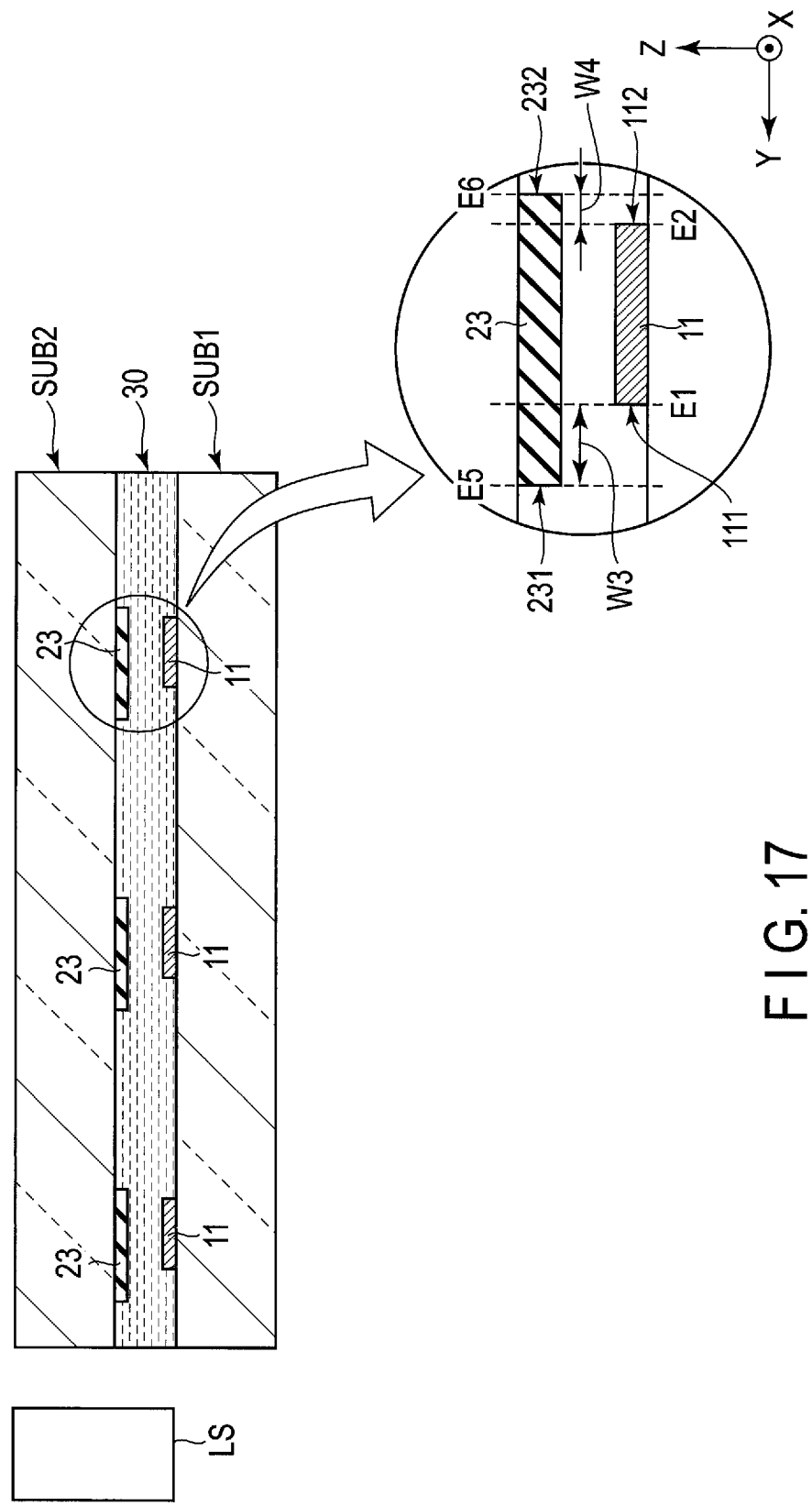
FIG. 17 is a cross-sectional view showing Fourth Embodiment.

FIG. 17 is a cross-sectional view showing Fourth Embodiment. The Fourth Embodiment is different from the First Embodiment with respect to a feature that a second substrate SUB2 comprises a light-shielding layer 23. The light-shielding layer 23 is located just above the conductive line 11. In the Fourth Embodiment, the light-shielding layer 23 is opposed to the entire body of the conductive line 11. The embodiment will be explained in more detail with reference to an enlarged view of the conductive line 11 and the light-shielding layer 23, which is surrounded by a solid line.

The light-shielding layer 23 is formed of the same material as the light-shielding layer 16. The light-shielding layer 23 comprises a fifth side surface 231, and a sixth side surface 232 on a side opposite to the fifth side surface 231. The fifth side surface 231 is closer to a light-emitting element LS than the sixth side surface 232. The fifth side surface 231 is closer to the light-emitting element LS than the first side surface 111, and the sixth side surface 232 is remoter from the light-emitting element LS than the second side surface 112.

In addition, the light-shielding layer 23 comprises a fifth edge E5 and a sixth edge E6 located at outermost portions in the second direction Y. The fifth edge E5 is closer to the light-emitting element LS than the first edge E1. The sixth edge E6 is remoter from the light-emitting element LS than the second edge E2. The light-shielding layer 23 has a third width W3 between the first edge E1 and the fifth edge E5, and a fourth width W4 between the second edge E2 and the sixth edge E6. The third width W3 is larger than or equal to the fourth width W4.

FIG. 18 is a cross-sectional view showing Fifth Embodiment. The Fifth Embodiment is different from the Fourth Embodiment with respect to a feature that a sixth side surface 232 is located just above a second side surface 112. A sixth edge E6 is located just above a second edge E2. Similarly to the Fourth Embodiment, a fifth side surface 231 is closer to a light-emitting element LS than a first side surface 111, and a fifth edge E5 is closer to the light-emitting element LS than a first edge E1.

FIG. 19 is a cross-sectional view showing Sixth Embodiment. The Sixth Embodiment is different from the Fourth Embodiment with respect to a feature that a sixth side surface 232 is closer to a light-emitting element LS than a second side surface 112. In other words, a light-shielding layer 23 is not disposed just above the second side surface 112. A sixth edge E6 is closer to the light-emitting element LS than a second edge E2.

According to the Fourth to Sixth Embodiments, as explained above, the light-shielding layer 23 is located just above at least the first side surface 111, of the conductive line 11. For this reason, when the light from the light-emitting element LS is propagated through the display panel PNL, even if undesired reflected light or scattered light is generated on the first side surface 111 facing the light-emitting element LS side of the conductive line 11, the reflected light or scattered light is blocked by the light-shielding layer 23. Therefore, degradation in display quality of an image displayed on the display panel PNL can be suppressed.

Figure 20:
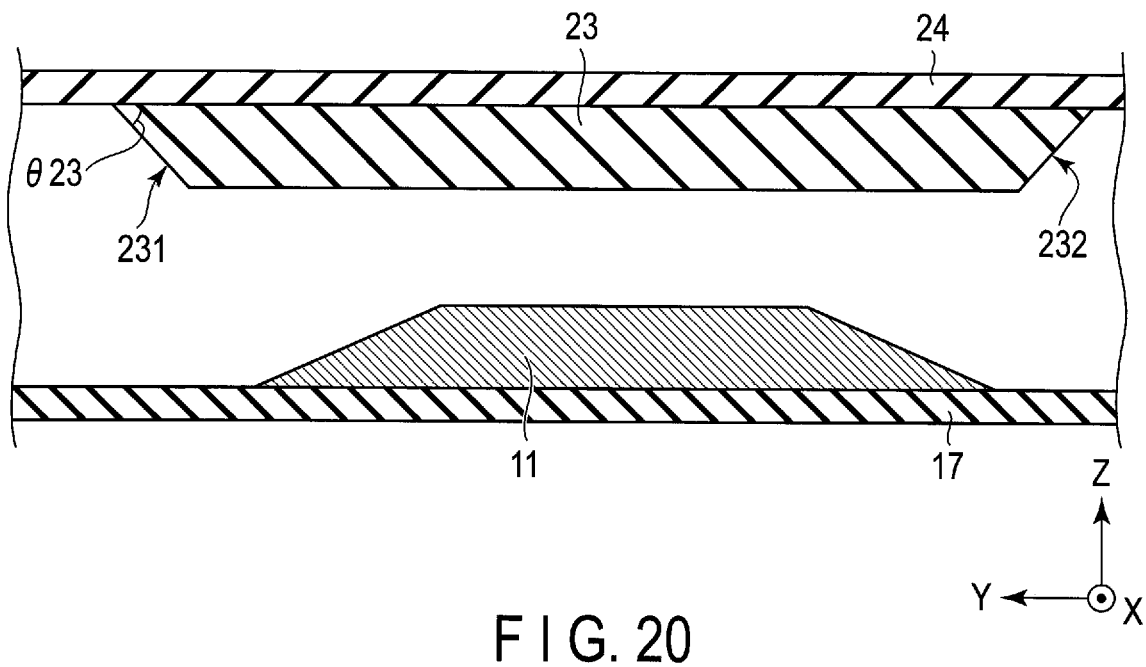
FIG. 20 is a cross-sectional view showing a tenth configuration example.

FIG. 20 is a cross-sectional view showing a tenth configuration example. The conductive line 11 is formed similarly to the first configuration example and the like. In the light-shielding layer 23, the fifth side surface 231 is inclined to an insulating layer 24 at an acute angle, i.e., third angle of inclination θ23. The sixth side surface 232 is inclined similarly to the fifth side surface 231. For this reason, even if the light propagating the display panel PNL is reflected on the fifth side surface 231, upward reflection or scattering in the third direction Z can be suppressed.

Figure 21:
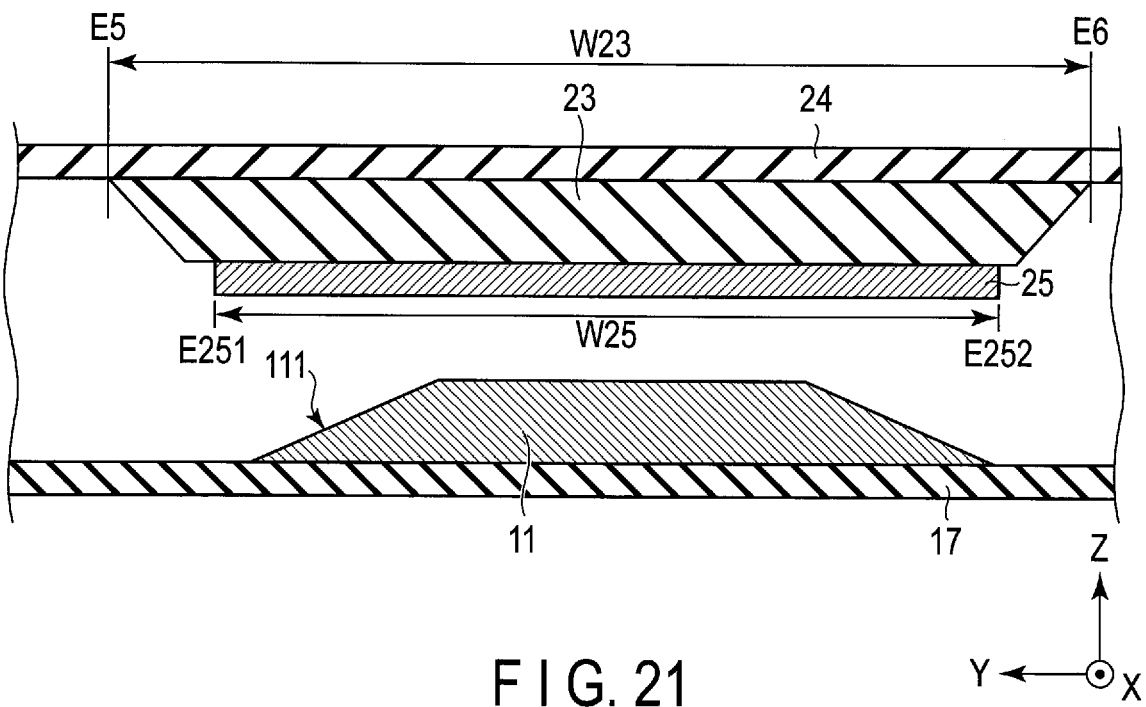
FIG. 21 is a cross-sectional view showing an eleventh configuration example.

FIG. 21 is a cross-sectional view showing an eleventh configuration example. The eleventh configuration example is different from the tenth configuration example with respect to a feature that a reflective layer 25 is provided between the light-shielding layer 23 and the conductive line 11. In the example illustrated, the reflective layer 25 is in contact with the light-shielding layer 23. A width W25 of the reflective layer 25 is smaller than the width W23 of the light-shielding layer 23. In addition, each of edges E251 and E252 of the reflective layer 25 is located between the fifth edge E5 and the sixth edge E6 of the light-shielding layer 23. For this reason, even if the light propagating the display panel PNL is reflected on the first side surface 111, the reflected light is reflected on the reflective layer 25 and can be further propagated through the display panel PNL. In other words, since the reflected light is hardly absorbed by the light-shielding layer 23, the light use efficiency can be improved.

Figure 22:
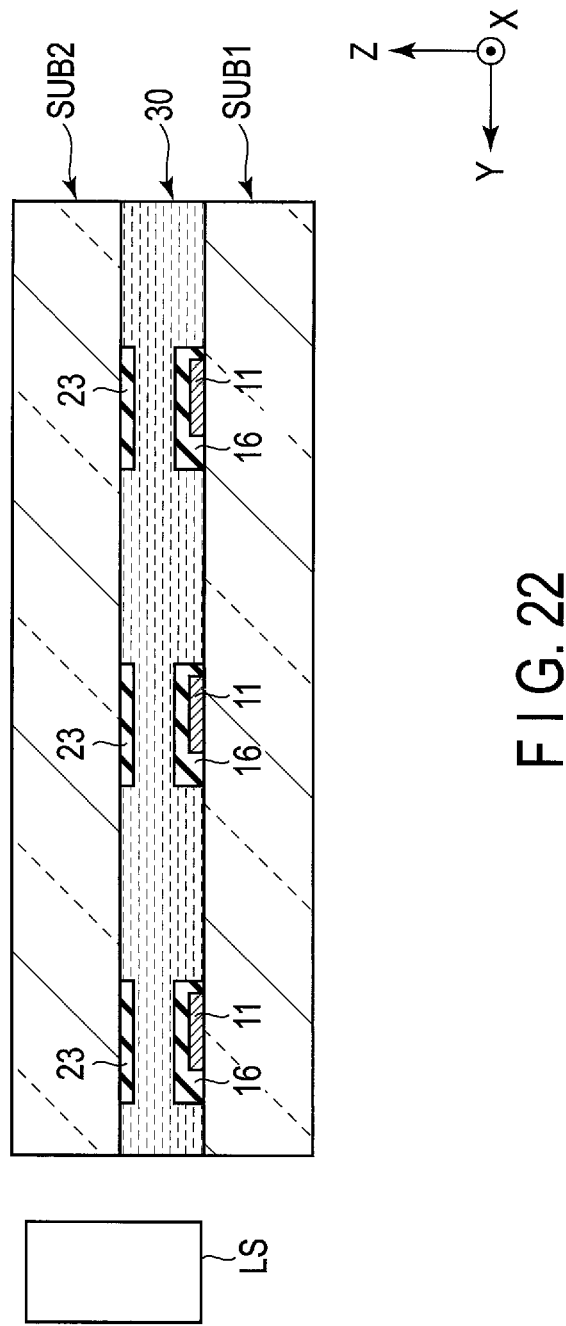
FIG. 22 is a cross-sectional view showing Seventh Embodiment.

FIG. 22 is a cross-sectional view showing Seventh Embodiment. The Seventh Embodiment is different from the First Embodiment with respect to a feature that a first substrate SUB1 comprises a conductive line 11 and a light-shielding layer (first light-shielding layer) 16 and a second substrate SUB2 comprises a light-shielding layer (second light-shielding layer) 23. According to the Seventh Embodiment, the same advantages as those of the First Embodiment can be obtained and, even if undesired reflected light or scattered light is generated in the light-shielding layer 16, the reflected light or scattered light is blocked by the light-shielding layer 23. Therefore, degradation in display quality of an image displayed on the display panel PNL can be suppressed.

Next, a polymer dispersed liquid crystal layer (hereinafter simply called a liquid crystal layer 30) will be explained in more detail.

FIG. 23 is an illustration schematically showing a liquid crystal layer 30 in a transparent state. The example illustrated corresponds to a state in which no voltage is applied to the liquid crystal layer 30 (for example, a state in which a potential difference between a pixel electrode 13 and a common electrode 21 is approximately zero). An optical axis Ax1 of the polymers 31 and an optical axis Ax2 of the liquid crystal molecules 32 are parallel to each other. In the example illustrated, each of the optical axis Ax1 and the optical axis Ax2 is parallel to the first direction X. The polymers 31 and the liquid crystal molecules 32 have approximately equivalent refractive anisotropy. In other words, ordinary refractive indexes of the polymers 31 and the liquid crystal molecules 32 are approximately equivalent to each other, and extraordinary refractive indexes of the polymers 31 and the liquid crystal molecules 32 are approximately equivalent to each other. For this reason, refractive index difference is hardly present between the polymers 31 and the liquid crystal molecules 32 in all directions including the first direction X, the second direction Y, and the third direction Z. For this reason, a light beam L1 incident on the liquid crystal layer 30 in the third direction Z is transmitted while hardly scattered in the liquid crystal layer 30. A light beam L2 incident in a direction oblique with respect to the third direction Z is hardly scattered in the liquid crystal layer 30, either. For this reason, high transparency can be obtained. The state illustrated in FIG. 23 is called a transparent state. For example, the light beam L3 corresponds to the light emitted from the light-emitting element LS shown in FIG. 3 and the like, and is propagated in a direction opposite to the direction represented by an arrow of the second direction Y while hardly scattered in the liquid crystal layer 30.

FIG. 24 is an illustration schematically showing the liquid crystal layer 30 in a scattering state. The example illustrated corresponds to a state in which a voltage is applied to the liquid crystal layer 30 (for example, a state in which a potential difference between the pixel electrode 13 and the common electrode 21 is higher than or equal to a threshold value). As explained above, the response performance of the polymer 31 to the electric field is lower than the response performance of the liquid crystal molecules 32 to the electric field. For example, the alignment direction of the polymers 31 is hardly varied irrespective of the presence or absence of the electric field. In contrast, the alignment direction of the liquid crystal molecules 32 is varied in accordance with the electric field in a state in which a voltage higher than or equal to the threshold value is applied to the liquid crystal layer 30. In other words, as illustrated in the drawing, the optical axis Ax1 is substantially parallel to the first direction X while the optical axis Ax2 is oblique to the first direction X. If the liquid crystal molecules 32 are positive liquid crystal molecules, the liquid crystal molecules 32 are aligned such that their major axes correspond to the electric field. An electric field between the pixel electrode 13 and the common electrode 21 is formed in the third direction Z. For this reason, the liquid crystal molecules 32 are aligned such that their major axes or the optical axes Ax2 correspond to the third direction Z. In other words, the optical axes Ax1 and optical axes Ax2 intersect each other. A large refractive index difference is therefore generated between the polymers 31 and the liquid crystal molecules 32 in all directions including the first direction X, the second direction Y, and the third direction Z. The light beams L1 to L3 incident on the liquid crystal layer 30 are thereby scattered in the liquid crystal layer 30. The state illustrated in FIG. 24 is called a scattering state.

FIG. 25 is a cross-sectional view showing a display panel PNL in a case where the liquid crystal layer 30 is in a transparent state. A light beam L11 emitted from the light-emitting element LS is made incident on the display panel PNL from the end portion E22 and is propagated through a transparent substrate 20, the liquid crystal layer 30, a transparent substrate 10, and the like. The liquid crystal layer 30 overlapping a conductive line 11 and a pixel electrode 13 is in a transparent state. For this reason, the light beam L11 is hardly scattered in the liquid crystal layer 30, and hardly leaks from a lower surface 10B of the transparent substrate 10 or an upper surface 201 of the transparent substrate 20.

An external light beam L12 incident on the display panel PNL is transmitted and hardly scattered in the liquid crystal layer 30. In other words, the external light beam L12 incident on the display panel PNL from the lower surface 10B is transmitted through the upper surface 201, and the external light beam L12 incident on the display panel PNL from the upper surface 201 is transmitted through the lower surface 10B. For this reason, the user can visually recognize a background on the lower surface 10B side through the display panel PNL when observing the display panel PNL from the upper surface 201 side. Similarly, the user can visually recognize a background on the upper surface 201 side through the display panel PNL when observing the display panel PNL from the lower surface 10B side.

FIG. 26 is a cross-sectional view showing the display panel PNL in a case where the liquid crystal layer 30 is in a scattering state. A light beam L21 emitted from the light-emitting element LS is made incident on the display panel PNL from the end portion E22 and is propagated through a transparent substrate 20, the liquid crystal layer 30, a transparent substrate 10, and the like. In the example illustrated, the liquid crystal layer 30 overlapping the conductive line 11 is maintained in a transparent state. In addition, the liquid crystal layer 30 overlapping a pixel electrode 13A to which no voltage is applied is in a transparent state. For this reason, the light beam L21 is hardly scattered in an area of the liquid crystal layer 30, which overlaps the pixel electrode 11 and the pixel electrode 13A. In contrast, the liquid crystal layer 30 overlapping a pixel electrode 13B to which a voltage is applied is in a scattered state. For this reason, the light beam L21 is scattered in an area of the liquid crystal layer 30, which overlaps the pixel electrode 13B. A scattered light beam L211 which is a part of the light beam L21 is transmitted through the upper surface 20T, a scattered light beam L212 which is another part of the light beam L21 is transmitted through the lower surface 10B, and the other scatter light beam is propagated through the inside of the display panel PNL.

In the area overlapping the pixel electrode 13A to which the voltage is not applied, an external light beam L22 incident on the display panel PNL is transmitted and hardly scattered in the liquid crystal layer 30, similarly to the external light beam L12 shown in FIG. 25. In the area overlapping the pixel electrode 13B to which the voltage is applied, an external light beam L23 incident from the lower surface 10B is scattered in the liquid crystal layer 30 and a light beam L231 which is a part of the external light beam L23 is transmitted through the upper surface 20T. In addition, an external light beam L24 incident from the upper surface 20T is scattered in the liquid crystal layer 30 and a light beam L241 which is a part of the external light beam L24 is transmitted through the lower surface 10B. For this reason, the user can visually recognize a color of the light beam L21 in the area overlapping the pixel electrode 13B when observing the display panel PNL from the upper surface 201 side. In addition, since the external light beam L231 is transmitted through the display panel PNL, the user can also visually recognize the background on the lower surface 10B side through the display panel PNL. Similarly, the user can visually recognize a color of the light beam L21 in the area overlapping the pixel electrode 13B when observing the display panel PNL from the lower surface 10B side. In addition, since the external light beam L241 is transmitted through the display panel PNL, the user can also visually recognize the background on the upper surface 20T side through the display panel PNL. In the area overlapping the pixel electrode 13A, the color of the light beam L21 can hardly be recognized visually and the user can visually recognize the background through the display panel PNL since the liquid crystal layer 30 is in the transparent state.

Next, an example will be explained.

Figure 27:
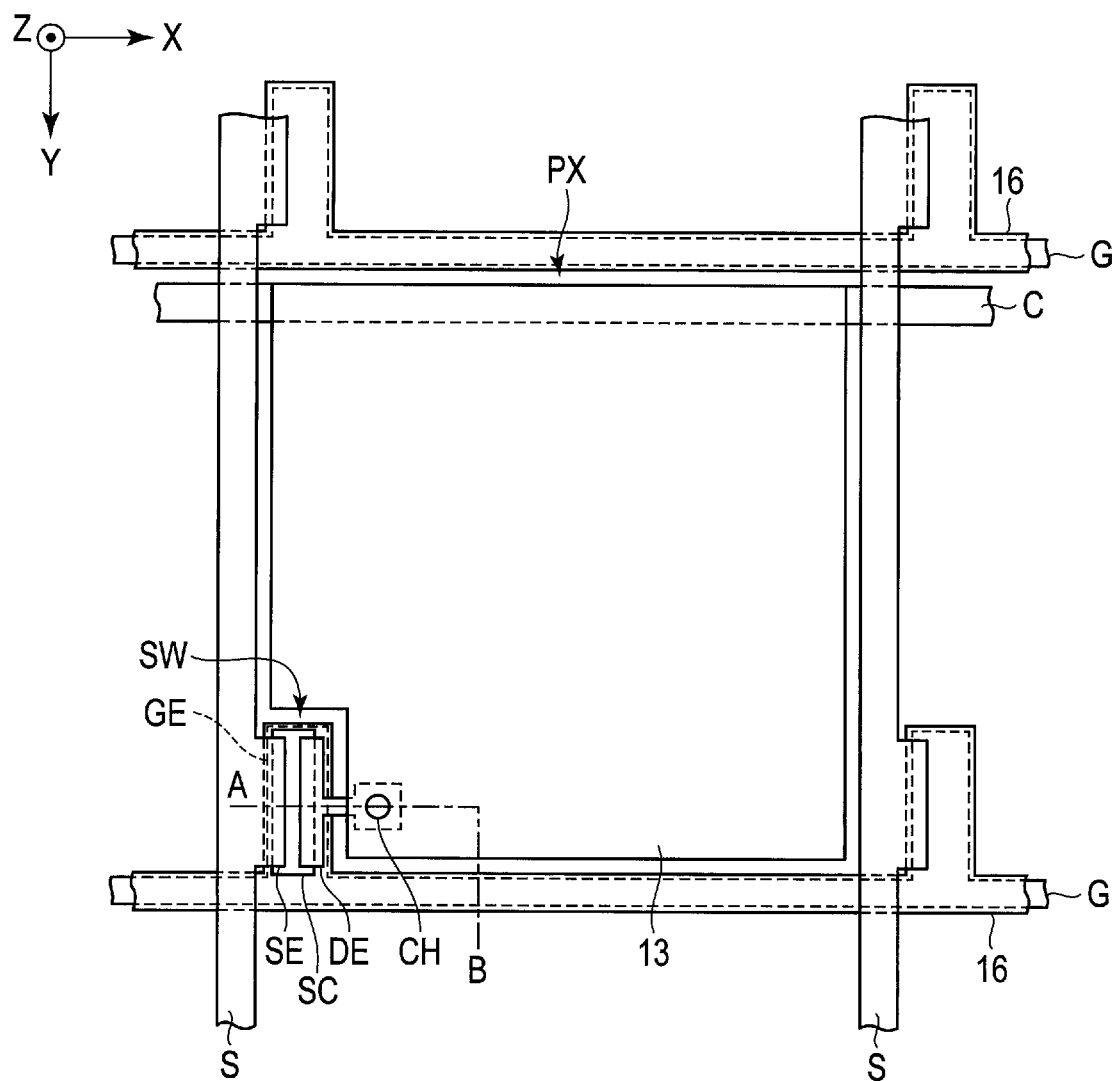
FIG. 27 is a plan view showing a configuration example of a pixel PX.

FIG. 27 is a plan view showing an example of the pixel PX. In the example illustrated, the pixel PX is sectioned by two signal lines S arranged in the first direction X and two scanning lines G arranged in the second direction Y. The pixel PX comprises a switching element SW and a pixel electrode 13. The switching element SW is, for example, a thin-film transistor and is electrically connected to the scanning line G and the signal line S. More specifically, the switching element SW comprises a semiconductor layer SC, a gate electrode GE, a source electrode SE, and a drain electrode DE. The gate electrode GE is formed integrally with the scanning line G. The light-shielding layer 16 overlaps the scanning lines G and the gate electrode GE. In the example illustrated, the switching element SW is a bottom-gate type switching element in which a gate electrode GE is located below the semiconductor layer SC, but may be a top-gate type switching element in which a gate electrode GE is located above the semiconductor layer SC. The semiconductor layer SC is formed of, for example, amorphous silicon, but may be formed of polycrystalline silicon or an oxide semiconductor. The source electrode SE is formed integrally with the signal line S and is in contact with the semiconductor layer SC. The drain electrode DE is remote from the source electrode SE and is in contact with the semiconductor layer SC. The pixel electrode 13 overlaps the drain electrode DE and is in contact with the drain electrode DE through the contact hole CH.

In addition, a capacitive line C is disposed between two scanning lines G. The pixel electrode 13 overlaps the capacitive line C. A storage capacitance is formed at a portion where the capacitive line C and the pixel electrode 13 overlap.

Figure 28:
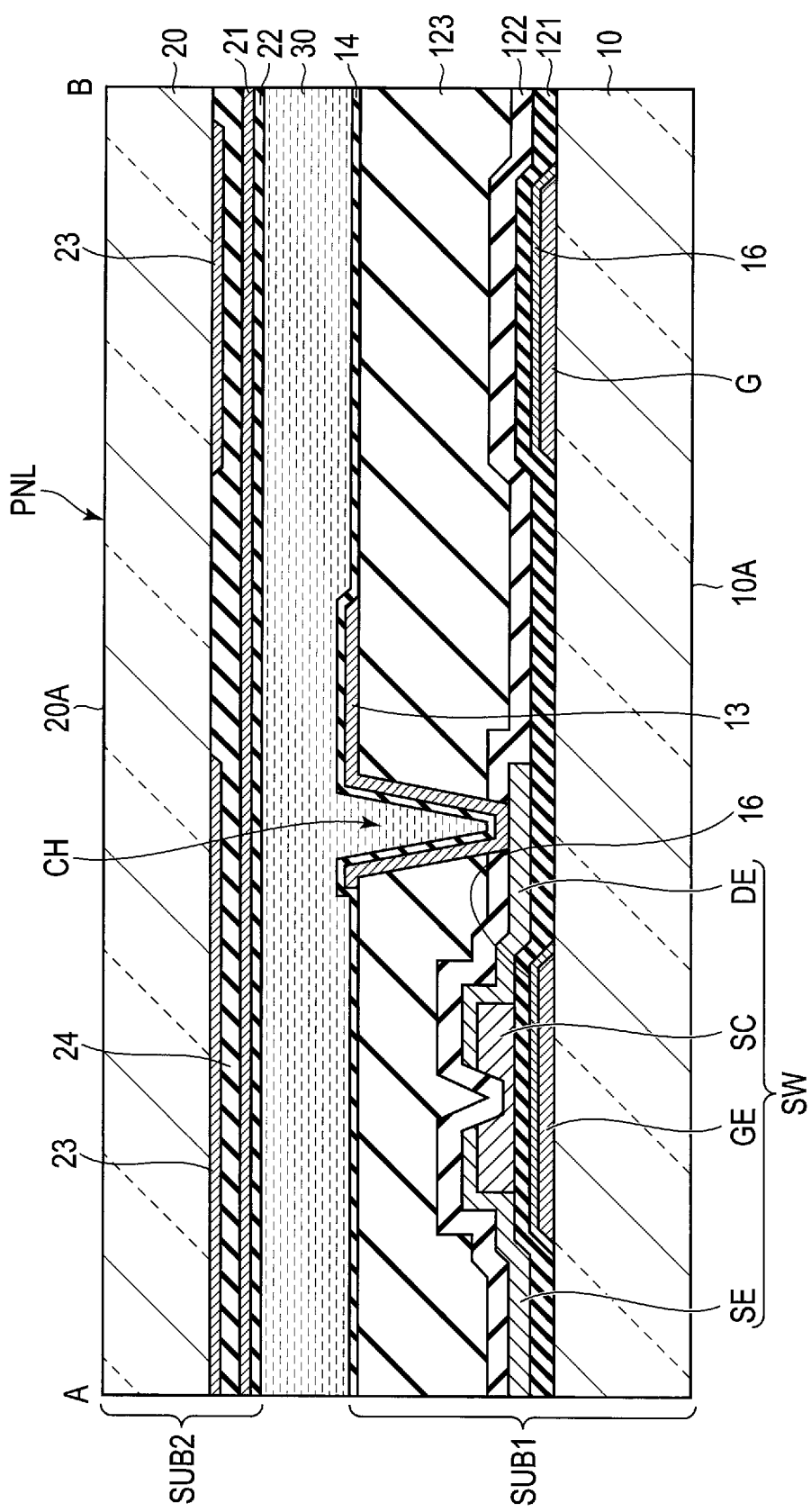
FIG. 28 is a cross-sectional view seen along line A-B in the pixel PX shown in FIG. 27.

FIG. 28 is a cross-sectional view seen along line A-B in the pixel PX shown in FIG. 27. In the first substrate SUB1, the gate electrode GE and a scanning line G are located on the transparent substrate 10 and correspond to, for example, the conductive lines 11 shown in FIG. 4. The light-shielding layer 16 is in contact with the gate electrode GE and the scanning line G, and covers the gate electrode GE and the scanning line G. An insulating layer 121 covers the light-shielding layer 16 and the transparent substrate 10. The semiconductor layer SC is located on the insulating layer 121 just above the gate electrode GE. Each of the source electrode SE and the drain electrode DE is located on the insulating layer 121 and is in contact with the semiconductor layer SC. An insulating layer 122 covers the semiconductor layer SC, the source electrode SE, the drain electrode DE, and the insulating layer 121. The insulating layer 123 covers the insulating layer 122. The insulating layers 121 to 123 correspond to, for example, the insulating layer 12 shown in FIG. 4. The insulating layers 121 and 122 are formed of, for example, a transparent inorganic insulating material such as silicon nitride or silicon oxide. The insulating layer 123 is formed of, for example, a transparent organic insulating material such as acrylic resin. The pixel electrode 13 is located on the insulating layer 123. The pixel electrode 13 is in contact with the drain electrode DE at the contact hole CH which penetrates the insulating layers 122 and 123. The alignment film 14 covers the pixel electrode 13 and the insulating layer 123.

In the second substrate SUB2, the light-shielding layer 23 is located below transparent substrate 20 and is also located just above the gate electrode GE and the scanning line G. The overcoat layer 24 covers the transparent substrate 20 and the light-shielding layer 23. The common electrode 21 is located below the overcoat layer 24. The alignment film 22 covers the common electrode 21. The liquid crystal layer 30 is in contact with the alignment films 14 and 21.

According to the above-explained embodiment, the scanning line G extending in the first direction X is covered with the light-shielding layer 16, and the light-shielding layer 23 is located just above the scanning line G. For this reason, the degradation in display quality which results from undesired reflection or scattering on the side surfaces of the scanning line G can be suppressed. As shown in FIG. 27, various conductive layers such as the capacitive line C, the source electrode SE, and the drain electrode DE comprise side surfaces in the first direction X, similarly to the scanning line G. For this reason, undesired reflection or scattering can be further suppressed by shielding the side surfaces of the capacitive line C, the source electrode SE, and the drain electrode DE in at least the first direction X against the light.

As explained above, according to the embodiments, in the configuration that the conductive layer of the conductive line, the electrode, and the like has the side surfaces with a comparatively high reflectance and the side surfaces face the light-emitting element LS side and intersect the direction of propagation of the light, undesired reflection or scattering can be suppressed by covering the side surfaces with the light-shielding layer 16, and undesired reflected light or scattered light can be blocked by arranging the light-shielding layer 23 just above the side surfaces. The display device capable of suppressing degradation in display quality can be therefore provided.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. For example, some structural elements may be deleted from the entire structural elements in the embodiments. Furthermore, the constituent elements described in different embodiments may be combined arbitrarily.

What is claimed is:

1. A display device, comprising:
    a first substrate;
    a conductive line including a first side surface and a second side surface on a side opposite to the first side surface on the first substrate;
    a second substrate opposed to the first substrate;
    a light-shielding layer on the second substrate;
    a liquid crystal layer held between the first substrate and the second substrate, and which includes a polymer and liquid crystal molecules; and
    a light-emitting element opposed to an end portion of at least one of the first substrate and the second substrate,
    wherein
    the first side surface is closer to the light-emitting element than the second side surface, and
    a center line of the light-shielding layer is located closer to the light-emitting element than a center line of the conductive line.

2. The display device of claim 1, wherein
    the conductive line includes a first edge and a second edge on a side opposite to the first edge,
    the first edge is closer to the light-emitting element than the second edge,
    the light-shielding layer includes a third edge closer to the light-emitting element than the first edge, and a fourth edge on a side opposite to the third edge, and
    a width between the first edge and the third edge is larger than or equal to a width between the second edge and the fourth edge.

3. The display device of claim 1, wherein
    the conductive line includes a first edge and a second edge on a side opposite to the first edge,
    the first edge is closer to the light-emitting element than the second edge, and the light-shielding layer includes a third edge closer to the light-emitting element than the first edge, and a fourth edge located above the second edge.

4. The display device of claim 1, wherein the conductive line includes a first edge, a second edge on a side opposite to the first edge, and an upper surface between the first edge and the second edge, the first edge is closer to the light-emitting element than the second edge, and the light-shielding layer includes a third edge closer to the light-emitting element than the first edge, and a fourth edge closer to the light-emitting element than the second edge.

5. The display device of claim 1, further comprising:

a reflective layer located between the light-shielding layer and the conductive line.

* * * * *